US011159462B2

United States Patent
Asukai

(10) Patent No.: US 11,159,462 B2
(45) Date of Patent: Oct. 26, 2021

(54) COMMUNICATION SYSTEM AND COMMUNICATION CONTROL METHOD

(71) Applicant: SONY CORPORATION, Tokyo (JP)

(72) Inventor: Masamichi Asukai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 195 days.

(21) Appl. No.: 16/068,973

(22) PCT Filed: Oct. 28, 2016

(86) PCT No.: PCT/JP2016/081986
§ 371 (c)(1),
(2) Date: Jul. 10, 2018

(87) PCT Pub. No.: WO2017/130497
PCT Pub. Date: Aug. 3, 2017

(65) Prior Publication Data
US 2019/0020609 A1 Jan. 17, 2019

(30) Foreign Application Priority Data
Jan. 28, 2016 (JP) .............................. JP2016-014238

(51) Int. Cl.
*G06F 40/30* (2020.01)
*H04L 12/58* (2006.01)
(Continued)

(52) U.S. Cl.
CPC ........ *H04L 51/046* (2013.01); *G06F 16/3329* (2019.01); *G06F 40/169* (2020.01);
(Continued)

(58) Field of Classification Search
None
See application file for complete search history.

(56) References Cited

U.S. PATENT DOCUMENTS

| 2015/0195406 A1* | 7/2015 | Dwyer ................ G06F 21/6254 |
| | | 379/265.07 |
| 2016/0364381 A1* | 12/2016 | Brown .................... G06F 40/35 |
| 2019/0378502 A1* | 12/2019 | Bostick ............... G10L 15/1815 |

FOREIGN PATENT DOCUMENTS

| JP | 2000-339314 A | 12/2000 |
| JP | 2001-117581 A | 4/2001 |

(Continued)

OTHER PUBLICATIONS

"Generation of Conversation Sentence That Considers Study of Template of Sentence and Feeling", Information Processing Society of Japan, 2015, 04 pages.

(Continued)

*Primary Examiner* — Cai Y Chen
(74) *Attorney, Agent, or Firm* — Chip Law Group

(57) ABSTRACT

The communication system includes a communication unit that receives a conversation of a user, an accumulation unit that accumulates a conversation frame that describes a structure of a conversation generated on a basis of the conversation of the user collected via the communication unit, and a control unit. The control unit obtains a feeling parameter related to a feeling of the user who sends the conversation in units of collected conversation, extracts the conversation frame from the conversation on a basis of the feeling parameter, and accumulates the conversation frame in the accumulation unit.

12 Claims, 37 Drawing Sheets

(51) Int. Cl.
  *H04M 3/51* (2006.01)
  *G06F 16/332* (2019.01)
  *G06F 40/35* (2020.01)
  *G06F 40/56* (2020.01)
  *G06F 40/169* (2020.01)
  *G06F 40/284* (2020.01)
  *G10L 13/00* (2006.01)
  *G06Q 50/00* (2012.01)
  *H04L 29/08* (2006.01)
  *G10L 17/22* (2013.01)
  *G10L 25/63* (2013.01)

(52) U.S. Cl.
  CPC ............ *G06F 40/284* (2020.01); *G06F 40/30* (2020.01); *G06F 40/35* (2020.01); *G06F 40/56* (2020.01); *G06Q 50/01* (2013.01); *G10L 13/00* (2013.01); *H04L 51/02* (2013.01); *H04L 51/32* (2013.01); *H04L 67/22* (2013.01); *H04M 3/5166* (2013.01); *G10L 17/22* (2013.01); *G10L 25/63* (2013.01); *H04L 51/16* (2013.01); *H04M 2201/40* (2013.01)

(56) References Cited

FOREIGN PATENT DOCUMENTS

| JP | 2001117581 A | * | 4/2001 |
|---|---|---|---|
| JP | 2003-173349 A | | 6/2003 |
| JP | 2013-190994 A | | 9/2013 |
| JP | 2015-069455 A | | 4/2015 |
| WO | 2013/190963 A1 | | 12/2013 |

OTHER PUBLICATIONS

Narimatsu, et al., "Supporting the Augmentation of the Question-Answer Database for Speech-Based Question-Answering System Using User Utterances", Information Society of Japan, vol. 2009-SLP-77, No. 16, Jul. 18, 2009, 06 pages.

International Search Report and Written Opinion of PCT Application No. PCT/JP2016/081986, dated Dec. 13, 2016, 10 pages of ISRWO.

Kato, et al., "Generation of Conversation Sentence That Considers Study of Template of Sentence and Feeling", Information Processing Society of Japan, 2015, 04 pages.

Office Action for JP Patent Application No. 2017-563695 dated Oct. 27, 2020, 04 pages of Office Action and 04 pages of English Translation.

Kazuki Kato, "Bun no Template no Gakushu Oyobi Kanjo o Koryo shita Kaiwa no Seisei", Information Processing society of Japan, Mar. 17, 2015, pp. 2-175-2-176.

* cited by examiner

FIG. 13

| AGENT ID | QUESTION SENTENCE | ADVERTISEMENT CONTENT | CONDITION, ETC. | PROBABILITY 0~1 |
|---|---|---|---|---|
| CHARACTER A | CHOCOLATE | CHOCOLATE NEWLY RELEASED BY BB COMPANY IS DELICIOUS BECAUSE MILK IS CONTAINED MUCH | USER IS 30 YEARS OLD OR LESS | 0.5 |
| CHARACTER A, PERSON B | I WANT TO EAT SOME DELICIOUS FOOD | I HEARD THAT GRILLED MEAT AT CC STORE IS DELICIOUS | YEAR-END PARTY SEASON (DEC.) | 0.5 |
| ALL | I'M THIRSTY | AA WATER (BRAND NAME) IS GOOD FOR THIRST | — | 0.1 |

FIG. 18

| EXPRESSION | HAPPINESS DEGREE CONTRIBUTION VALUE | | | |
|---|---|---|---|---|
| | FACTOR 1 | FACTOR 2 | FACTOR 3 | FACTOR 4 |
| SELF-FULFILLMENT | 1 | 0 | 0 | 0 |
| PLAN | 0.5 | 0 | 0 | 0 |
| EMPATHY | 0 | 1 | 0 | 0 |
| THANK YOU | 0 | 1 | 0 | 0 |
| THANKFULNESS | 0 | 1 | 0 | 0 |
| POSITIVE THINKING | 0 | 0 | 1 | 0 |
| OWN PACE | 0 | 0 | 0 | 1 |
| FREELY | 0 | 0 | 0.5 | 0.5 |
| ... | ... | ... | ... | ... |

FIG. 19

| CONVERSATION ID | | DATE AND TIME | ID OF PERSON WHO HAS MADE CONVERSATION | TEXT | DEGREE OF HAPPINESS |
|---|---|---|---|---|---|
| C01 | C01-01 | 2015/3/5 12:00 | U01 | "I MADE A TASTY GRATIN YESTERDAY!" | [0,0,0,0] |
| | C01-02 | 2015/3/5 12:03 | U02 | "YOU CAN MAKE A TASTY GRATIN. THAT SOUNDS GREAT." | [0,0,0,0] |
| | C01-03 | 2015/3/5 12:04 | U01 | "NOT REALLY GREAT, BUT THANK YOU." | [0,1,0,0] |
| C02 | C02-01 | 2015/7/1 12:00 | U03 | I DID STUDY ONLY FOR TWO HOURS TODAY. I AM WORRY ABOUT IF I CAN MAKE IT IN TIME BEFORE THE EXAMINATION. | [0,0,0,0] |
| | C02-02 | 2015/7/1 13:00 | U04 | YOU DID STUDY HARD FOR TWO HOURS. | [0,0,0,0] |
| | C02-03 | 2015/7/1 13:40 | U03 | EXACTLY! I WILL PLAN TO CREATE LONGER TIME FOR TOMORROW. | [0.5,0,0,0] |
| ... | | | | ... | ... |

FIG. 21

| ADJECTIVE | FEELING VALUE |
|---|---|
| TASTY | 1 |
| DIRTY | -1 |
| INTERESTING | 1 |
| BEAUTIFUL | 1 |
| ROUGH | 0 |
| ... | ... |

FIG. 22

| FRAME ID | CONDITION | RESPONSE |
|---|---|---|
| F01 | I MADE <ADJECTIVE> <NOUN> | YOU CAN MAKE <ADJECTIVE> <NOUN>. THAT SOUNDS GREAT! |
| F02 | I DID <NOUN 1> ONLY FOR <NOUN 2> | YOU DID <NOUN 1> HARD FOR <NOUN 2>. |
| F03 | IT'S ALL OVER | WHY ARE YOU MAKING COMPLAINTS? GET IT TOGETHER! |
| ... | ... | ... |

FIG. 31

| EXPRESSION | ATTRIBUTE PARAMETER CONTRIBUTION VALUE | | |
|---|---|---|---|
| | NOVELTY SEEKING | REWARD DEPENDENCE | HARM AVOIDANCE |
| FEEL COMFORTABLE WITH STIMULATION | 1.0 | 0.0 | 0.0 |
| THRILLED | 1.0 | 0.0 | 0.0 |
| CAN'T STOP | 0.0 | 1.0 | 0.0 |
| BECOME HABIT | 0.0 | 1.0 | 0.0 |
| WORRY ABOUT IF I CAN MAKE IT IN TIME | 0.0 | 0.0 | 1.0 |
| NOT GOOD AT APPEARING IN PUBLIC | 0.0 | 0.0 | 1.0 |
| ... | ... | ... | ... |

FIG. 32

| CONVERSATION ID | | DATE AND TIME | ID OF PERSON WHO HAS MADE CONVERSATION | TEXT | DEGREE OF HAPPINESS | ATTRIBUTE PARAMETER |
|---|---|---|---|---|---|---|
| C01 | C01-01 | 2015/3/5 12:00 | U01 | I MADE A TASTY GRATIN YESTERDAY! | [0,0,0,0] | [0,0,0] |
| | C01-02 | 2015/3/5 12:03 | U02 | YOU CAN MAKE A TASTY GRATIN. THAT SOUNDS GREAT. | [0,0,0,0] | [0,0,0] |
| | C01-03 | 2015/3/5 12:04 | U01 | NOT REALLY GREAT, BUT THANK YOU. | [0,1,0,0] | [0,0,0] |
| C02 | C02-01 | 2015/7/1 12:00 | U03 | I DID STUDY ONLY FOR TWO HOURS. I AM WORRY ABOUT IF I CAN MAKE IT IN TIME BEFORE THE EXAMINATION. | [0,0,0,0] | [0,0,1] |
| | C02-02 | 2015/7/1 13:00 | U04 | YOU DID STUDY HARD FOR TWO HOURS. | [0,0,0,0] | [0,0,0] |
| | C02-03 | 2015/7/1 13:40 | U03 | EXACTLY! I WILL PLAN TO CREATE LONGER TIME FOR TOMORROW. | [0.5,0,0,0] | [0,0,0] |
| ... | | ... | | ... | ... | ... |

FIG. 33

| ID OF PERSON WHO HAS MADE CONVERSATION | NUMBER OF UTTERANCES | ATTRIBUTE PARAMETER | | | ATTRIBUTE TYPE |
|---|---|---|---|---|---|
| | | NOVELTY SEEKING | REWARD DEPENDENCE | HARM AVOIDANCE | |
| U01 | 2736 | 127.9 | 354.2 | 2012.4 | 001 |
| U02 | 1543 | 659.3 | 472.1 | 36.5 | 110 |
| U03 | 372 | 12.7 | 124.5 | 65.9 | 010 |
| ... | ... | ... | ... | ... | ... |

FIG. 35

| FRAME ID | CONDITION | RESPONSE | ATTRIBUTE TYPE |
|---|---|---|---|
| F01 | MAKE <ADJECTIVE: POSITIVE> <NOUN> | YOU MADE <ADJECTIVE> <NOUN>. THAT SOUNDS GREAT! | 001 |
| F02 | CAN DO <NOUN> ONLY FOR <NOUN> | YOU DID <NOUN> HARD FOR <NOUN>. | 101 |
| F03 | IT'S ALL OVER. | WHY ARE YOU MAKING COMPLAINTS? GET IT TOGETHER! | 110 |
| F04 | MAKE <ADJECTIVE: POSITIVE> <NOUN> | IT'S INTERESTING TO MAKE <ADJECTIVE> <NOUN>. LET'S MAKE MORE! | 010 |
| F05 | MAKE <ADJECTIVE: POSITIVE> <NOUN> | YOU CAN MAKE MORE <ADJECTIVE> <NOUN>. YOU CAN DO IT! | 100 |
| ... | ... | ... | ... |

COMMUNICATION SYSTEM AND COMMUNICATION CONTROL METHOD

CROSS REFERENCE TO RELATED APPLICATIONS

This application is a U.S. National Phase of International Patent Application No. PCT/JP2016/081986 filed on Oct. 28, 2016, which claims priority benefit of Japanese Patent Application No. JP 2016-014238 filed in the Japan Patent Office on Jan. 28, 2016. Each of the above-referenced applications is hereby incorporated herein by reference in its entirety.

TECHNICAL FIELD

The present disclosure relates to a communication system and a communication control method.

BACKGROUND ART

In recent years, with the development of communication technologies, messages have frequently been exchanged via networks. Users can use information processing terminals such as smartphones, mobile phone terminals, and tablet terminals to confirm messages transmitted from other terminals and transmit messages.

In addition, an agent system that uses an information processing terminal to automatically respond to messages from a user has been proposed. In relation to such a system, Patent Literature 1 described below, for example, discloses a system that ascertains feelings that a user has on the basis of content of a conversation with the user, extracts specific keywords included in language that expresses the ascertained feelings, and performs retrieval on the basis of the extracted keywords, thereby retrieving information that better coincides with a request of the user.

In addition, Patent Literature 2 described below discloses an apparatus that performs voice recognition on a voice response of a user in response to a recommendation from an agent, specifies a recognized character string, determines a type of an outline feeling on the basis of content of the recognized character string, and learns a feeling of the user in response to the recommendation.

CITATION LIST

Patent Literature

Patent Literature 1: JP 2003-173349A

DISCLOSURE OF INVENTION

Technical Problem

Here, voice of an automatic response from the agent is based on conversation data generated in advance on assumption of questions and answers with the user, and how the user feels through the conversation is not taken into consideration.

Thus, the present disclosure proposes a communication system and a communication control method capable of leading a user to a predetermined feeling by using a conversation structure generated from actual conversations between users.

Advantageous Effects of Invention

According to the present disclosure, there is provided a communication system including: a communication unit that receives a conversation of a user; an accumulation unit that accumulates a conversation frame that describes a structure of a conversation generated on a basis of the conversation of the user collected via the communication unit; and a control unit that obtains a feeling parameter related to a feeling of the user who sends the conversation in units of the collected conversation, extracts the conversation frame from the conversation on a basis of the feeling parameter, and accumulates the conversation frame in the accumulation unit.

According to the present disclosure, there is provided a communication control method including, by a processor: receiving a conversation of a user by a communication unit; accumulating, in an accumulation unit, a conversation frame that describes a structure of a conversation generated on a basis of the conversation of the user collected via the communication unit; obtaining a feeling parameter related to a feeling of the user who sends the conversation in units of the collected conversation; and extracting the conversation frame from the conversation on a basis of the feeling parameter and accumulating the conversation frame in the accumulation unit.

According to the present disclosure, it is possible to lead a user to a predetermined feeling by using a conversation structure generated from actual conversations between users as described above.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is a diagram illustrating an example of advertisement information registered in an advertisement DB according to the embodiment.

FIG. 18 is a diagram illustrating an example of evaluation values of four factors in characteristic keywords according to the first embodiment.

FIG. 19 is a diagram illustrating an example of conversation data accumulated in a conversation history DB according to the first embodiment.

FIG. 21 is a diagram illustrating an example of a feeling value table of adjectives according to the first embodiment.

FIG. 22 is a diagram illustrating an example of a conversation frame according to the first embodiment.

FIG. 31 is a diagram illustrating an example of three attribute parameter contribution values in characteristic keywords according to the second embodiment.

FIG. 32 is a diagram illustrating an example of conversation data accumulated in a conversation history according to the second embodiment.

FIG. 33 illustrates an example of attribute data of an utterer accumulated in an attribute DB according to the second embodiment.

FIG. 35 is a diagram illustrating an example of a conversation frame registered in a conversation frame according to the second embodiment.

MODE(S) FOR CARRYING OUT THE INVENTION

Figure 1:
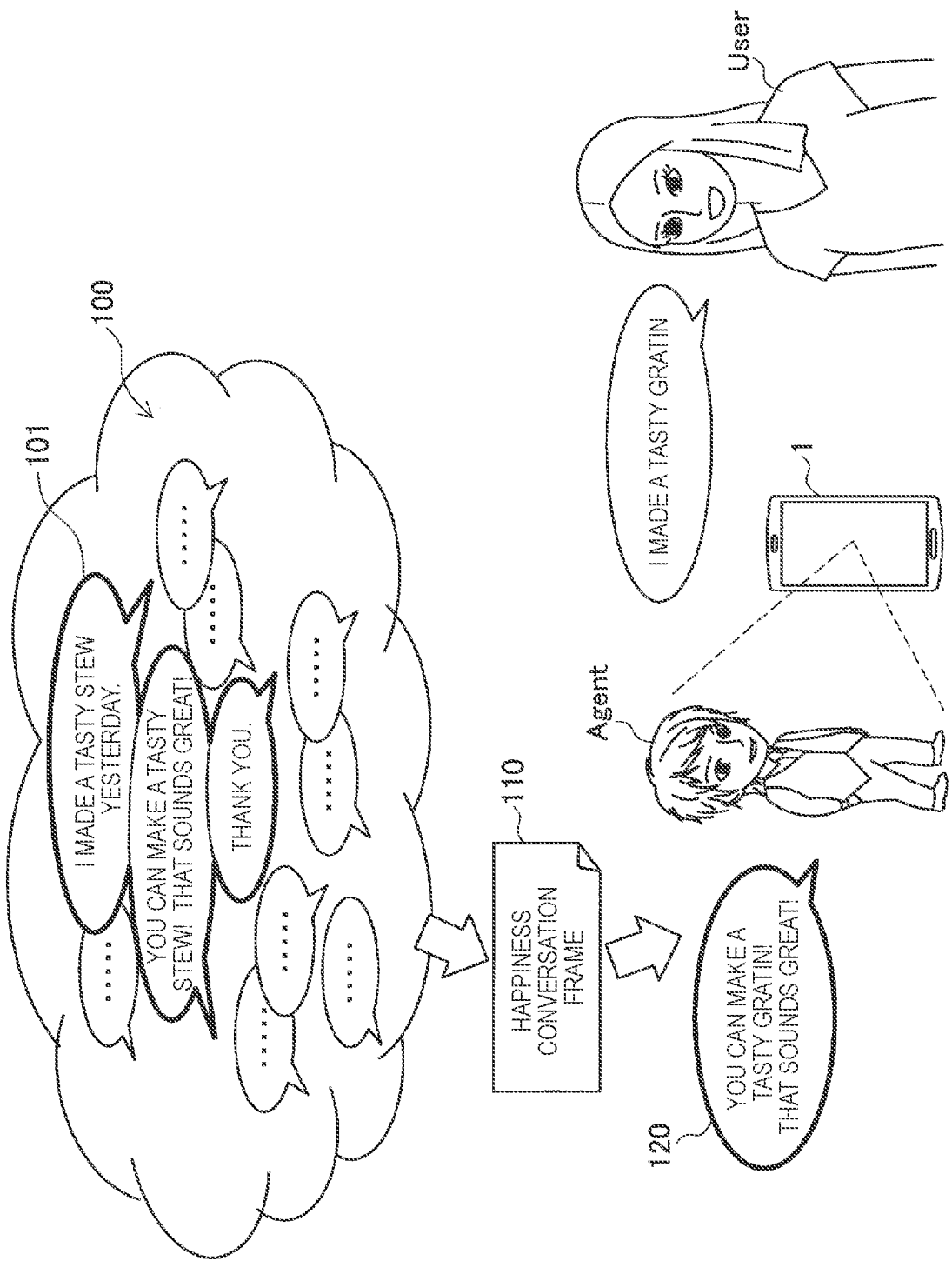
FIG. 1 is an explanatory diagram illustrating an overview of a communication control system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Overview of communication control system according to embodiment of the present disclosure
2. Configuration
2-1. System configuration
2-2. Server configuration
3. System operation process
3-1. Conversation data registration process
3-2. Phoneme DB generation process
3-3. Dialogue control process
3-4. Conversation DB updating process
3-5. Advertisement insertion process
4. Dialogue control processing according to first embodiment
4-1. Generation of conversation frame
(4-1-1. Configuration of conversation DB generation unit 50A)
(4-1-2. Conversation frame generation processing)
(4-1-3. Happiness degree calculation processing)
(4-1-4. Conversation frame generation processing)
4-2. Generation of response sentence
(4-2-1. Configuration of dialogue processing unit 300A)
(4-2-2. Response processing)
(4-2-3. Response sentence generation processing)
(4-2-4. Response sentence output processing)
5. Dialogue control processing according to second embodiment
5-1. Generation of conversation frame
(5-1-1. Configuration of conversation DB generation unit 50B)
(5-1-2. Conversation frame generation processing)
(5-1-3. Attribute analysis processing)
5-2. Generation of response sentence
(5-2-1. Configuration of dialogue processing unit 300B)
(5-2-2. Response sentence generation processing)
6. Conclusion <<Overview of Communication Control System According to Embodiment of Present Disclosure>>

A communication control system according to an embodiment of the present disclosure is capable of leading a user to a predetermined feeling by using a conversation structure generated from actual conversations between users. Hereinafter, an outline of the communication control system according to the embodiment will be described with reference to FIG. 1.

FIG. 1 is an explanatory diagram illustrating the overview of the communication control system according to an embodiment of the present disclosure. A voice dialogue with an agent is performed via a client terminal 1 such as a smartphone, a mobile phone terminal, or a wearable terminal that the user owns, for example. The client terminal 1 has a microphone and a speaker and enables dialogue between the user and the agent by collecting voice of the user and reproducing voice of the agent.

Here, on the agent side, a database in which data of questions and answers to and from the user that are assumed to occur, for example, is accumulated in advance is provided, and thus automatic responses can be realized by outputting response voice (response data registered in advance) in response to spoken voice of the user.

However, such an automatic responding method does not take how the user feels through the conversation into consideration.

Thus, the communication control system (that is, an agent system) according to the embodiment is capable of leading the user to a predetermined feeling by using a conversation structure generated from actual conversations between users. Specifically, the communication control system first analyzes a conversation group 100 obtained by collecting multiple actual conversation data items between the users exchanged via a network as illustrated in FIG. 1. Regarding such collection of conversation data, the data is collected from messages exchanged on social media and from voice conversations, for example. Then, the communication control system generates a conversation frame (happiness conversation frame 110) in which the user has a "happy feeling" on the basis of a series of conversations 101 ("I made a tasty stew yesterday." "You can make a tasty stew! That's sounds great!") in which the user had the predetermined feeling, for example, the "happy feeling" (referred to as "happiness" in the specification). In the specification, the "conversation frame" describes a conversation structure.

Then, the communication control system fills in the corresponding happiness conversation frame 110, for example, "You can make <adjective> <noun>! That sounds great!) in response to the utterance from the user, for example, "I made a tasty gratin." (language analysis result: "I made <adjective> <noun>."), generates response voice 120 such as "You can make a tasty gratin! That sounds great!" and reproduces it as a speech of the agent.

As described above, the communication control system according to the embodiment can cause the agent to output a response that gives the user a happy feeling as a speech of the agent in conversations between the user and the agent.

In addition, the communication control system (agent system) according to the embodiment is not limited to a voice agent that performs a response by voice, and a text treatment agent that performs a response on a text basis may be used in the client terminal 1.

<<2. Configuration>>
<2-1. System Configuration>

Figure 2:
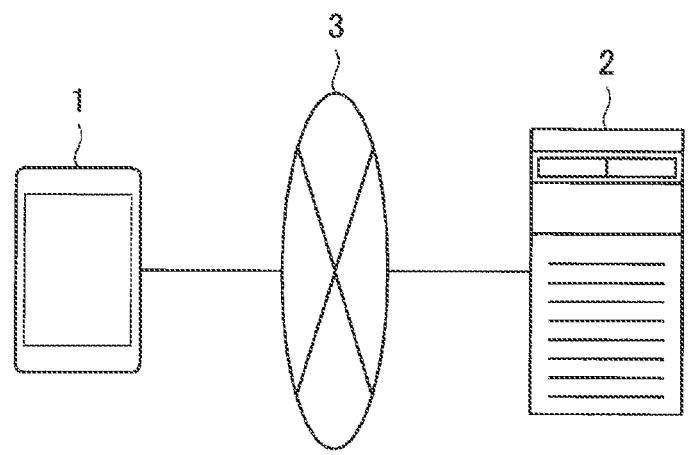
FIG. 2 is a diagram illustrating an overall configuration of the communication control system according to the embodiment.

Next, an overall configuration of the above-described communication control system according to the embodiment will be described with reference to FIG. 2. FIG. 2 is a diagram illustrating an overall configuration of the communication control system according to the embodiment.

As illustrated in FIG. 2, the communication control system according to the embodiment includes the client terminal 1 and an agent server 2.

The agent server 2 is connected to the client terminal 1 via a network 3 and transmits and receives data. Specifically, the agent server 2 generates response voice to spoken voice collected and transmitted by the client terminal 1 and transmits the response voice to the client terminal 1. The agent server 2 includes a phoneme database (DB) corresponding to one or more agents and can generate response voice through the voice of a specific agent. Herein, the agent may be a character of a cartoon, an animation, a game, a drama, or a movie, an entertainer, a celebrity, a historical person, or the like or may be, for example, an average person of each generation without specifying an individual. In addition, the agent may be an animal or a personified character. In addition, the agent may be a person in whom the personality of the user is reflected or a person in whom the personality of a friend, a family member, or an acquaintance of the user is reflected.

In addition, the agent server 2 can generate response content in which the personality of each agent is reflected. The agent server 2 can supply various services such as management of a schedule of the user, transmission and reception of messages, and supply of information through dialogue with the user via the agent.

The client terminal 1 is not limited to the smartphone illustrated in FIG. 2. For example, a mobile phone terminal, a tablet terminal, a personal computer (PC), a game device, a wearable terminal (smart eyeglasses, a smart band, a smart watch, or a smart necklace) may also be used. In addition, the client terminal 1 may also be a robot.

The overview of the communication control system according to the embodiment has been described above. Next, a configuration of the agent server 2 of the communication control system according to the embodiment will be described specifically with reference to FIG. 3.

<2-2. Agent Server 2>

Figure 3:
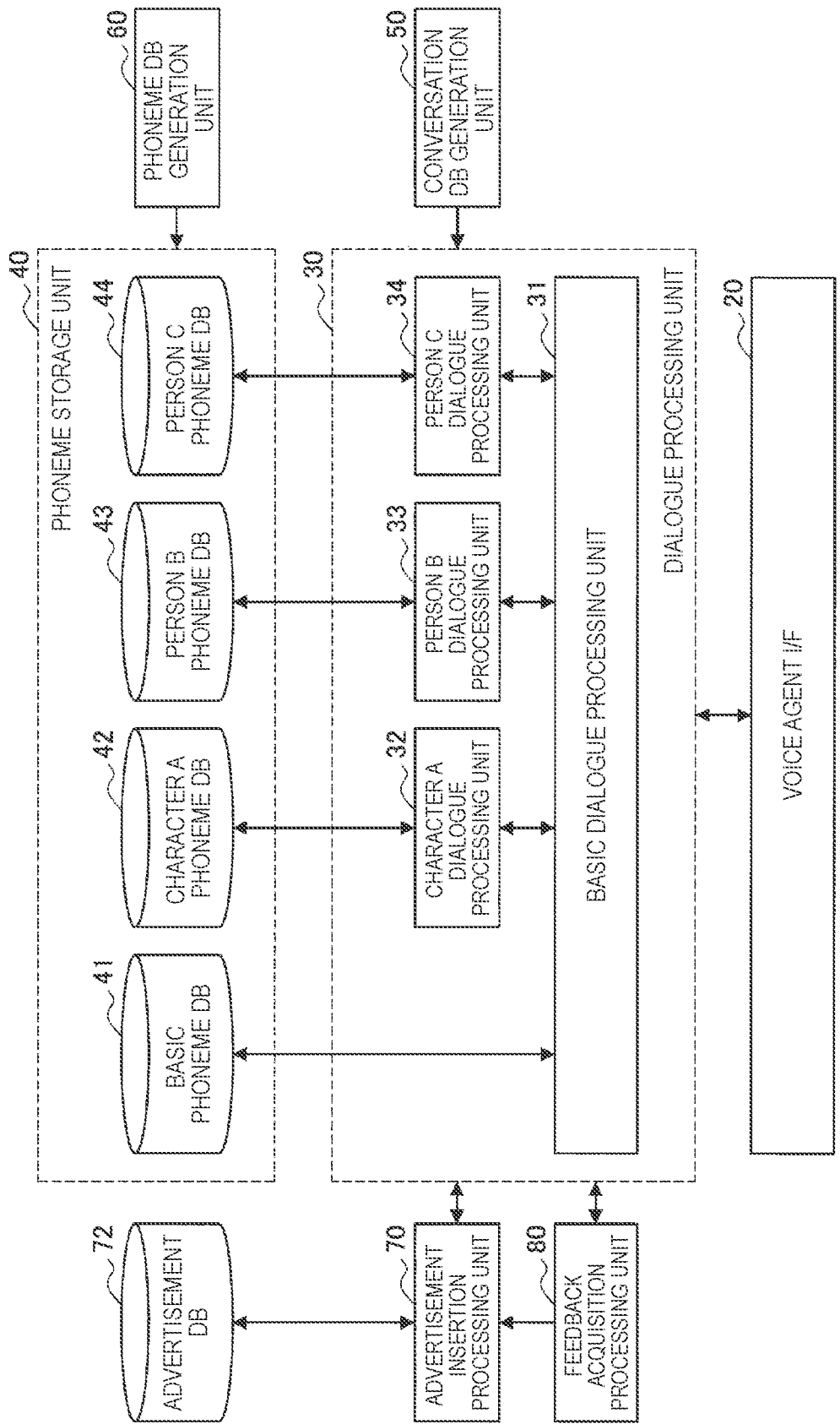
FIG. 3 is a block diagram illustrating an example of a configuration of a voice agent server according to the embodiment.

FIG. 3 is a block diagram illustrating an example of the configuration of the agent server 2 according to the embodiment. As illustrated in FIG. 3, the agent server 2 includes a voice agent interface (I/F) 20, a dialogue processing unit 30, a phoneme storage unit 40, a conversation DB generation unit 50, a phoneme DB generation unit 60, an advertisement insertion processing unit 70, an advertisement DB 72, and a feedback acquisition processing unit 80.

The voice agent I/F 20 functions as an input and output unit, a voice recognition unit, and a voice generation unit for voice data. As the input and output unit, a communication unit that transmits and receives data to and from the client terminal 1 via the network 3 is assumed. The voice agent I/F 20 can receive the spoken voice of the user from the client terminal 1, process the voice, and convert the spoken voice into text through voice recognition. In addition, the voice agent I/F 20 processes answer sentence data (text) of the agent output from the dialogue processing unit 30 to vocalize answer voice using phoneme data corresponding to the agent and transmits the generated answer voice of the agent to the client terminal 1.

The dialogue processing unit 30 functions as an arithmetic processing device and a control device and controls overall operations in the agent server 2 in accordance with various programs. The dialogue processing unit 30 is realized by, for example, an electronic circuit such as a central processing unit (CPU) or a microprocessor. In addition, the dialogue processing unit 30 according to the embodiment functions as a basic dialogue processing unit 31, a character A dialogue processing unit 32, a person B dialogue processing unit 33, and a person C dialogue processing unit 34.

The character A dialogue processing unit 32, the person B dialogue processing unit 33, and the person C dialogue processing unit 34 realize dialogue specialized for each agent. Herein, examples of the agent include a "character A," a "person B," and a "person C" and the embodiment is, of course, not limited thereto. Each dialogue processing unit realizing dialogue specialized for many agents may be further included. The basic dialogue processing unit 31 realizes general-purpose dialogue not specialized for each agent.

Herein, a basic configuration common to the basic dialogue processing unit 31, the character A dialogue processing unit 32, the person B dialogue processing unit 33, and the person C dialogue processing unit 34 will be described with reference to FIG. 4.

Figure 4:
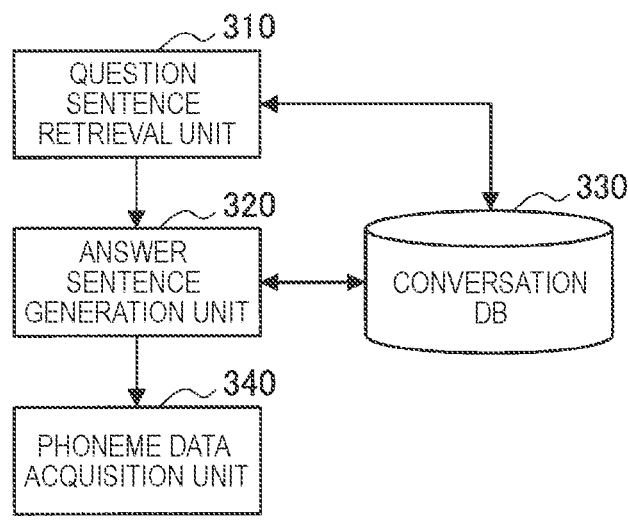
FIG. 4 is a diagram illustrating an example of a configuration of a dialogue processing unit according to the embodiment.

FIG. 4 is a diagram illustrating an example of a configuration of the dialogue processing unit 300 according to the embodiment. As illustrated in FIG. 4, the dialogue processing unit 300 includes a question sentence retrieval unit 310, an answer sentence generation unit 320, a phoneme data acquisition unit 340, and a conversation DB 330. The conversation DB 330 stores CONVERSATION data in which question sentence data and answer sentence data are paired. In the dialogue processing unit specialized for the agent, conversation data specialized for the agent is stored in the conversation DB 330. In a general-purpose dialogue processing unit, general-purpose data (that is, basic conversation data) not specific to the agent is stored in the conversation DB 330.

The question sentence retrieval unit 310 recognizes question voice (which is an example of spoken voice) of the user output from the voice agent I/F 20 and retrieves question sentence data matching the question sentence converted into text from the conversation DB 330. The answer sentence generation unit 320 extracts the answer sentence data stored in association with the question sentence data retrieved by the question sentence retrieval unit 310 from the conversation DB 330 and generates the answer sentence data. The phoneme data acquisition unit 340 acquires phoneme data for vocalizing an answer sentence generated by the answer sentence generation unit 320 from the phoneme storage unit 40 of the corresponding agent. For example, in the case of the character A dialogue processing unit 32, phoneme data for reproducing answer sentence data through the voice of the character A is acquired from the character A phoneme DB 42. Then, the dialogue processing unit 300 outputs the generated answer sentence data and the acquired phoneme data to the voice agent I/F 20.

The phoneme storage unit 40 stores a phoneme database for generating voice of each agent. The phoneme storage unit 40 can be realized by a read-only memory (ROM) and a random access memory (RAM). In the example illustrated in FIG. 3, a basic phoneme DB 41, a character A phoneme DB 42, a person B phoneme DB 43, and a person C phoneme DB 44 are stored. In each phoneme DB, for example, a phoneme segment and a prosodic model which is control information for the phoneme segment are stored as phoneme data.

The conversation DB generation unit 50 has a function of generating the conversation DB 330 of the dialogue processing unit 300. For example, the conversation DB generation unit 50 collects assumed question sentence data, collects answer sentence data corresponding to each question, and subsequently pairs and stores the question sentence data and the answer sentence data. Then, when a predetermined number of pieces of conversation data (pairs of question sentence data and answer sentence data: for example, 100 pairs) are collected, the conversation DB generation unit 50 registers the conversation data as a set of conversation data of the agent in the conversation DB 330.

The phoneme DB generation unit 60 has a function of generating the phoneme DB stored in the phoneme storage unit 40. For example, the phoneme DB generation unit 60 analyzes voice information of predetermined read text, decomposes the voice information into the phoneme segment and the prosodic model which is control information, and performs a process of registering a predetermined number or more of pieces of voice information as phoneme data in the phoneme DB when the predetermined number or more of pieces of voice information are collected.

The advertisement insertion processing unit 70 has a function of inserting advertisement information into dialogue of the agent. The advertisement information to be inserted can be extracted from the advertisement DB 72. In the advertisement DB 72, advertisement information (for example, information such as advertisement content of text, an image, voice, or the like, an advertiser, an advertisement period, and an advertisement target person) requested by a supply side such as a company (a vendor or a supplier) is registered.

The feedback acquisition processing unit 80 has a function of inserting a question for acquiring feedback into dialogue of the agent and obtaining the feedback from the user.

The configuration of the agent server 2 according to the embodiment has been described specifically above. Note that the configuration of the agent server 2 according to the embodiment is not limited to the example illustrated in FIG. 3. For example, each configuration of the agent server 2 may be achieved by another server on a network.

Next, a basic operation process of the communication control system according to the embodiment will be described with reference to FIGS. 5 to 14.

<<3. System Operation Process>>

<3-1. Conversation Data Registration Process>

Figure 5:
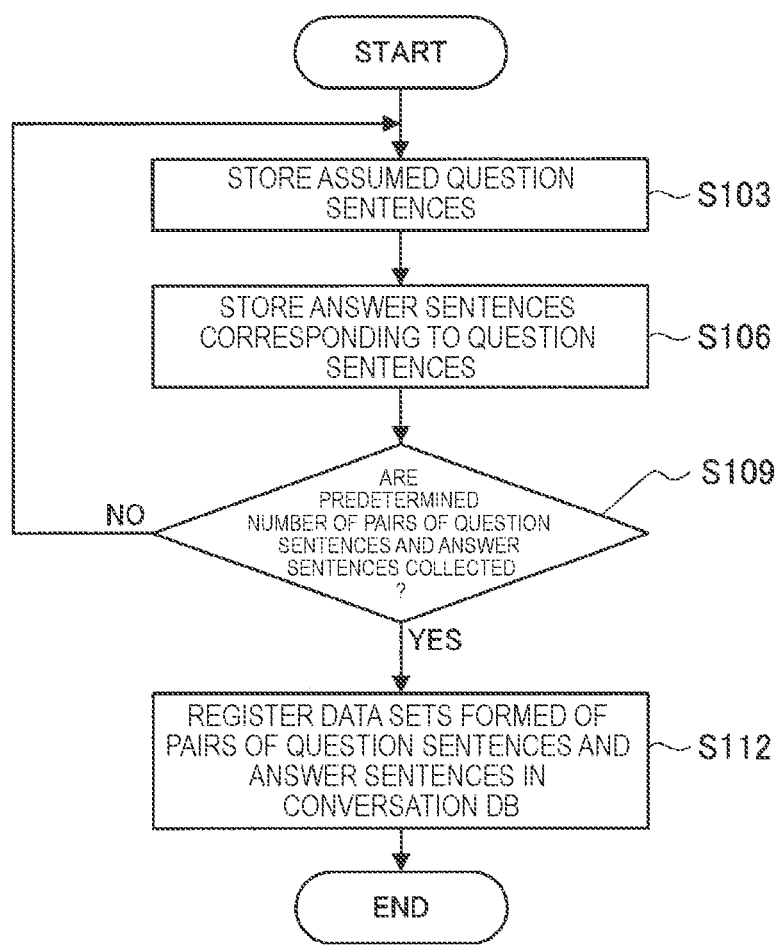
FIG. 5 is a flowchart illustrating a conversation DB generation process according to the embodiment.

FIG. 5 is a flowchart illustrating a generation process of the conversation DB 330 according to the embodiment. As illustrated in FIG. 5, the conversation DB generation unit 50 first stores assumed question sentences (step S103).

Subsequently, the conversation DB generation unit 50 stores answer sentences corresponding to (paired with) the question sentences (step S106).

Subsequently, the conversation DB generation unit 50 determines whether a predetermined number of pairs of question sentences and answer sentences (also referred to as conversation data) are collected (step S109).

Then, in a case in which the predetermined number of pairs of question sentences and conversation sentences are collected (Yes in step S109), the conversation DB generation unit 50 registers the data sets formed of many pairs of question sentences and answer sentences in the conversation DB 330 (step S112). As examples of the pairs of question sentences and answer sentences, for example, the following pairs are assumed.

Examples of pairs of question sentences and answer sentences

Pair 1

Question sentence: Good morning.

Answer sentence: How are you doing today?

Pair 2

Question sentence: How's the weather today?

Answer sentence: Today's weather is OO.

The pairs can be registered as conversation data in the conversation DB 330.

<3-2. Phoneme DB Generation Process>

Figure 6:
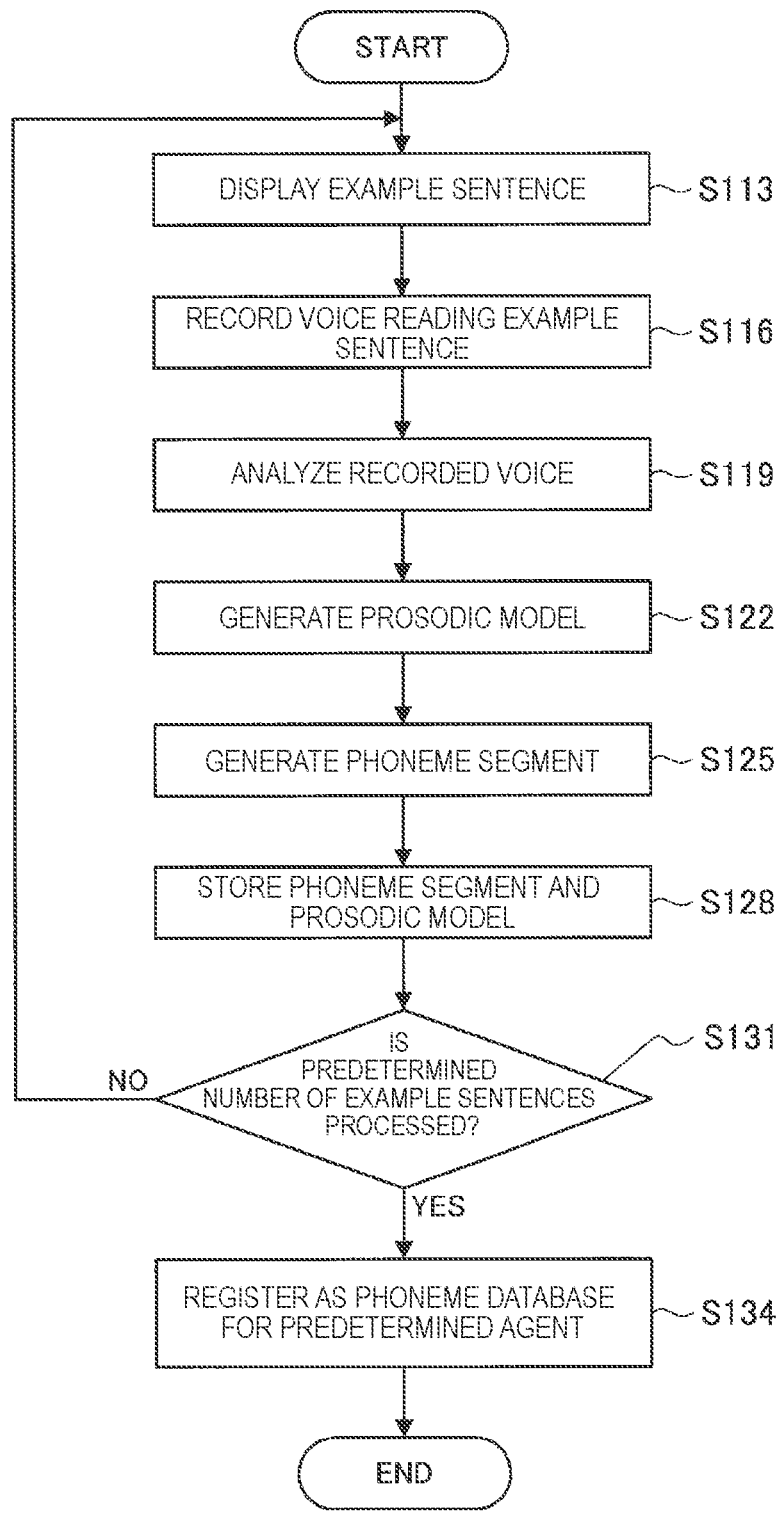
FIG. 6 is a flowchart illustrating a phoneme DB generation process according to the embodiment.

FIG. 6 is a flowchart illustrating a phoneme DB generation process according to the embodiment. As illustrated in FIG. 6, the phoneme DB generation unit 60 first displays an example sentence (step S113). In the display of the example sentence, for example, an example sentence necessary to generate phoneme data is displayed on a display of an information processing terminal (not illustrated).

Subsequently, the phoneme DB generation unit 60 records voice reading the example sentence (step S116) and analyzes the recorded voice (step S119). For example, voice information read by a person who takes charge of the voice of an agent is collected by the microphone of the information processing terminal. Then, the phoneme DB generation unit 60 receives and stores the voice information and further performs voice analysis.

Subsequently, the phoneme DB generation unit 60 generates a prosodic model on the basis of the voice information (step S122). The prosodic model extracts prosodic parameters indicating prosodic features of the voice (for example, a tone of the voice, strength of the voice, and a speech speed) and differs for each person.

Subsequently, the phoneme DB generation unit 60 generates a phoneme segment (phoneme data) on the basis of the voice information (step S125).

Subsequently, the phoneme DB generation unit 60 stores the prosodic model and the phoneme segment (step S128).

Subsequently, the phoneme DB generation unit 60 determines whether a predetermined number of the prosodic models and the phoneme segments are collected (step S131).

Then, in a case in which the predetermined number of prosodic models and phoneme segments are collected (Yes in step S131), the phoneme DB generation unit 60 registers the prosodic models and the phoneme segments as a phoneme database for a predetermined agent in the phoneme storage unit 40 (step S134).

<3-3. Dialogue Control Process>

Figure 7:
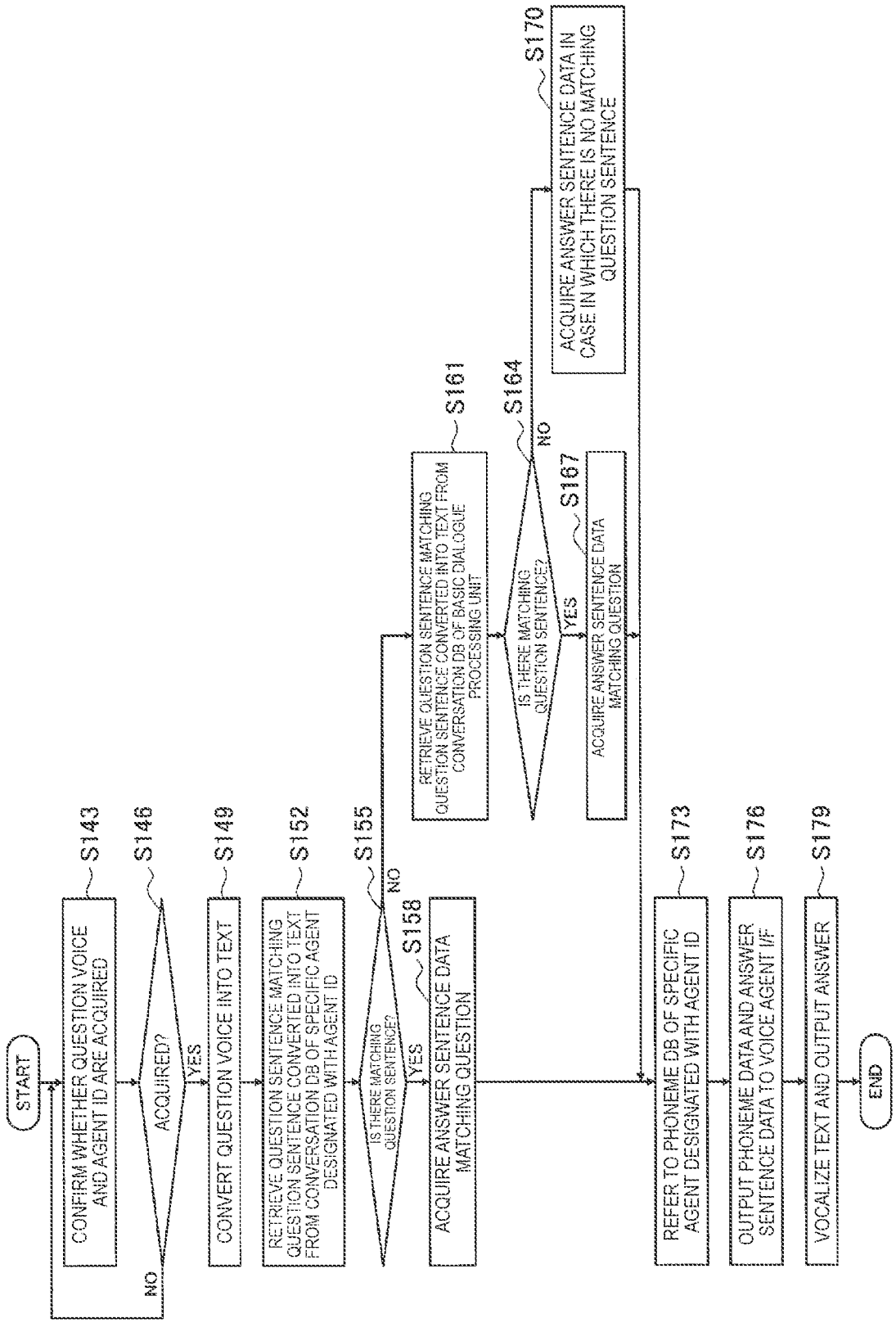
FIG. 7 is a flowchart illustrating a dialogue control process according to the embodiment.

FIG. 7 is a flowchart illustrating a dialogue control process according to the embodiment. As illustrated in FIG. 7, the voice agent I/F 20 first confirms whether question voice and an agent ID of a user are acquired (step S143). The agent ID is identification information indicating a specific agent such as the character A, the person B, or the person C. The user can purchase phoneme data of each agent. For example, an ID of the agent purchased in a purchase process is stored in the client terminal 1.

Subsequently, when the question voice and the agent ID of the user are acquired (Yes in step S146), the voice agent I/F 20 converts the question voice into text through voice recognition (step S149). The voice agent I/F 20 outputs the question sentence converted into text to the dialogue processing unit of the specific agent designated with the agent ID. For example, in the case of "agent ID: agent A" the voice agent I/F 20 outputs the question sentence converted into text to the character A dialogue processing unit 32.

Subsequently, the dialogue processing unit 30 retrieves a question sentence matching the question sentence converted into text from the conversation DB of the specific agent designated with the agent ID (step S152).

Subsequently, in a case in which there is a matching question (Yes in step S155), the character A dialogue processing unit 32 acquires answer sentence data corresponding to (paired with and stored) the question from the conversation DB of the specific agent (step S158).

Conversely, in a case in which there is no matching question (No in step S155), a question sentence matching the question sentence converted into text is retrieved from the conversation DB of the basic dialogue processing unit 31 (step S161).

In a case in which there is a matching question sentence (Yes in step S161), the basic dialogue processing unit 31 acquires the answer sentence data corresponding to (paired with and stored) the question from the conversation DB of the basic dialogue processing unit 31 (step S167).

Conversely, in a case in which there is no matching question (No in step S164), the basic dialogue processing unit 31 acquires answer sentence data (for example, an answer sentence "I don't understand the question") in a case in which there is no matching question sentence (step S170).

Subsequently, the character A dialogue processing unit 32 acquires phoneme data of the character A for generating voice of the answer sentence data with reference to the phoneme DB (herein, the character A phoneme DB 42) of the specific agent designated with the agent ID (step S173).

Subsequently, the acquired phoneme data and answer sentence data are output to the voice agent I/F 20 (step S176).

Then, the voice agent I/F 20 vocalizes the answer sentence data (text) (voice synthesis) using the phoneme data and transmits the answer sentence data to the client terminal 1 (step S179). The client terminal 1 reproduces the answer sentence through the voice of the character A.

<3-4. Conversation DB Updating Process>

Next, a process of updating the conversation DB 330 of each dialogue processing unit 300 will be described. In the embodiment, it is possible to extend the conversation DB 330 by a conversation with a user.

Figure 8:
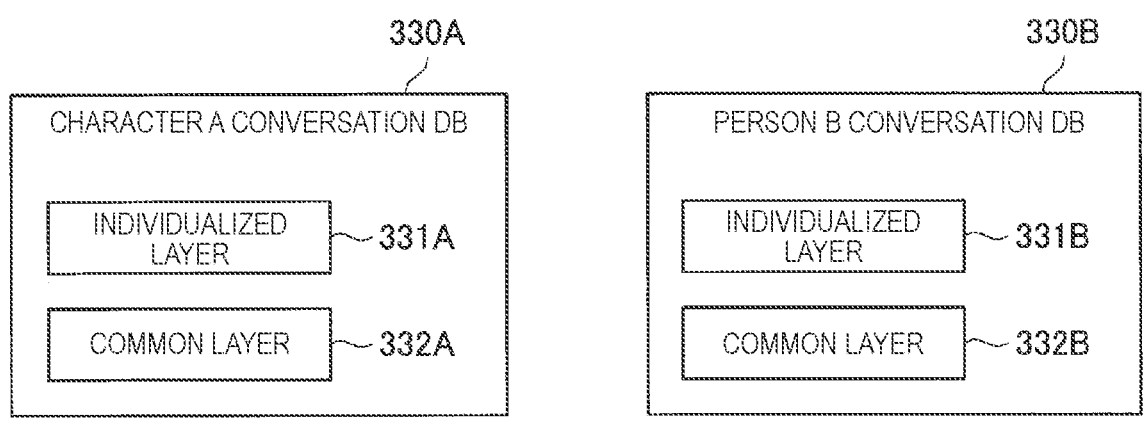
FIG. 8 is an explanatory diagram illustrating a data configuration example of the conversation DB according to the embodiment.

First, a data configuration example of the conversation DB 330 will be described supplementarily with reference to FIG. 8. FIG. 8 is an explanatory diagram illustrating a data configuration example of the conversation DB 330 according to the embodiment. As illustrated in FIG. 8, each conversation DB 330 includes two layers, an individualized layer 331 and a common layer 332. For example, in the case of a character A conversation DB 330A, conversation data in which personality or a feature of the character A is reflected is retained in the common layer 332A. On the other hand, in an individualized layer 331A, conversation data customized only for a user through a conversation with the user is retained. That is, the character A phoneme DB 42 and the character A dialogue processing unit 32 are supplied (sold) as a set to users. Then, certain users X and Y perform dialogues with the same character A at first (conversation data retained in the common layer 332A is used). However, as the dialogues continue, conversation data customized only for each user is accumulated in the individualized layer 331A for each user. In this way, it is possible to supply the users X and Y with dialogues with the character A in accordance with preferences of the users X and Y.

In addition, even in a case in which the agent "person B" is an average person of each generation who has no specific personality such as the character A, the conversation data can be customized only for the user. That is, for example, in a case in which the "person B" is a "person in his or her twenties," average conversation data of his or her twenties is retained in the common layer 332B and dialogue with the user is continued so that the customized conversation data is retained in the individualized layer 331B of each user. As dialogues with the user continue, customized conversation data is retained in the individualized layer 331B for each user. In addition, the user can also select favorite phoneme data such as "male," "female," "high-tone voice," or "low-tone voice" as the voice of the person B from the person B phoneme DB 43 and can purchase the favorite phoneme data.

Figure 9:
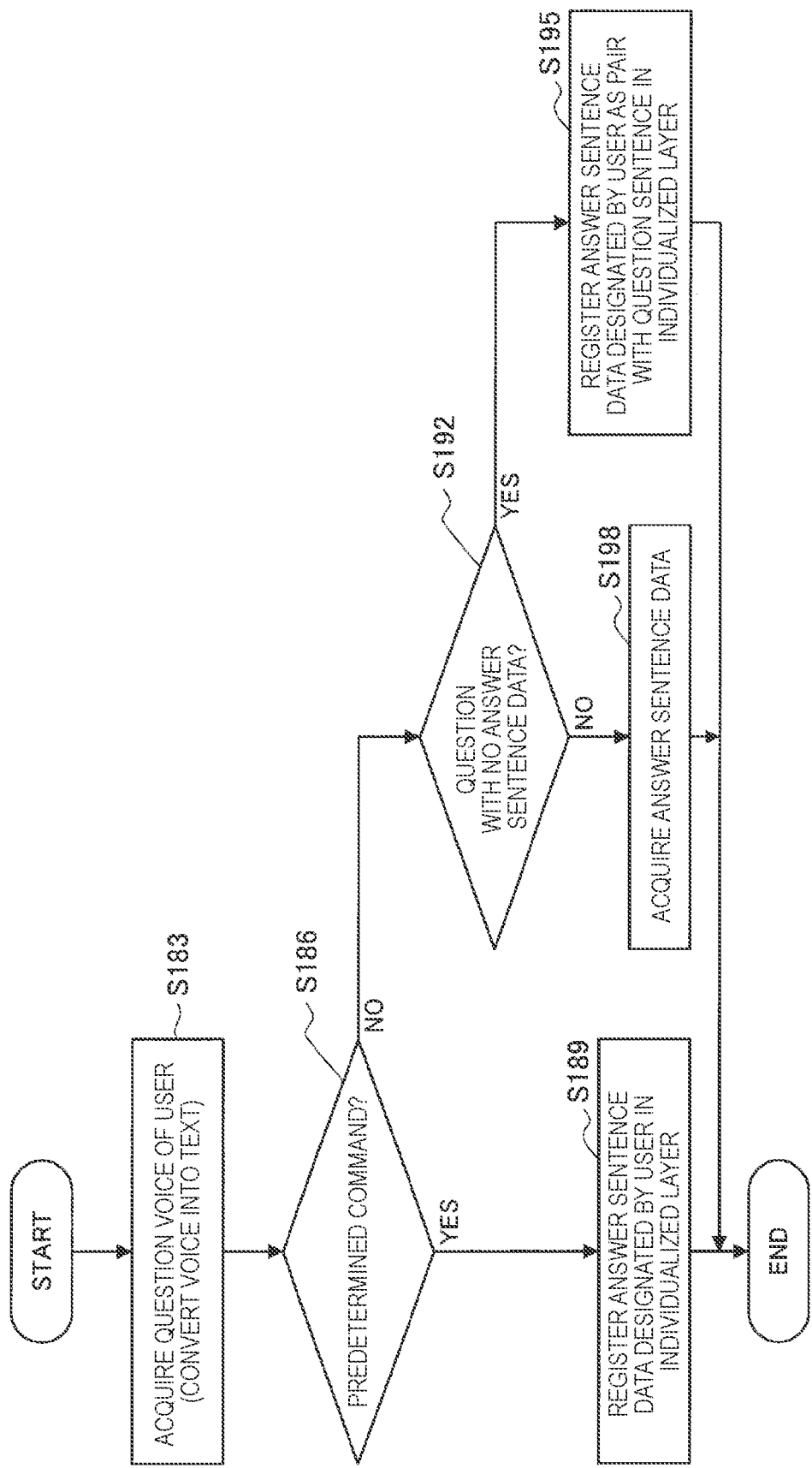
FIG. 9 is a flowchart illustrating a process of updating the conversation DB according to the embodiment.

A specific process at the time of the customization of the conversation DB 330 will be described with reference to FIG. 9. FIG. 9 is a flowchart illustrating a process of updating the conversation DB 330 according to the embodiment.

As illustrated in FIG. 9, the voice agent I/F 20 first acquires (receives) question voice of the user from the client terminal 1 and converts the question voice into text through voice recognition (step S183). The data (question sentence data) converted into text is output to the dialogue processing unit (herein, for example, the character A dialogue processing unit 32) of the specific agent designated by the agent ID.

Subsequently, the character A dialogue processing unit 32 determines whether the question sentence data is a predetermined command (step S186).

Subsequently, in a case in which the question sentence data is the predetermined command (Yes in step S186), the character A dialogue processing unit 32 registers answer sentence data designated by the user as a pair with the question sentence data in the individualized layer 331A of the conversation DB 330A (step S189). The predetermined command may be, for example, a word "NG" or "Setting." For example, the conversation DB of the character A can be customized in accordance with a flow of the following conversation.

User: "Good morning"
Character A: "Good morning"
User: "NG Answer to fine do your best"
Character A: "Fine do your best"

In the flow of the foregoing conversation, "NG" is the predetermined command After "NG" is spoken by the user, the character A dialogue processing unit 32 registers answer sentence data "Fine do your best" designated by the user as a pair with the question sentence data "Good morning" in the individualized layer 331A of the conversation DB 330A.

Conversely, in a case in which the question sentence data is not the predetermined command (No in step S186), the character A dialogue processing unit 32 retrieves the answer sentence data retained as the pair with the question sentence data from the character A conversation DB 330A. In a case in which the answer sentence data retained as the pair with the question sentence data is not retained in the character A conversation DB 330A, that is, a question of the user is a question with no answer sentence (Yes in step S192), the character A dialogue processing unit 32 registers the answer sentence data designated by the user as a pair with the question sentence in the individualized layer 331A (step S195). For example, in a flow of the following conversation, the conversation DB of the character A can be customized.

User A: "Fine?"
Character A: "I can't understand the question" (answer data example in case in which there is no corresponding answer)
User: "When I questions "Fine?," answer to "Fine today""
Character A: "Fine today"

In the flow of the foregoing conversation, since there is no answer sentence data maintained to be paired with "Fine?," "I can't understand the question" which is an example of the answer data in the case in which there is no corresponding answer is acquired by the character A dialogue processing unit 32, is output along with corresponding phoneme data of the character A to the voice agent I/F 20, and is reproduced in the client terminal 1. Subsequently, when the answer sentence "Fine today" designated by the user is input, the character A dialogue processing unit 32 registers "Fine today" as the pair with the question sentence data "Fine?" in the individualized layer 331A.

Conversely, in a case in which the question of the user is a question for which there is an answer sentence (No in step S192), the character A dialogue processing unit 32 acquires the answer sentence data and outputs the answer sentence data along with the corresponding phoneme data of the character A to the voice agent I/F 20. Then, the answer sentence is reproduced through the voice of the character A in the client terminal 1 (step S198).

Figure 10:
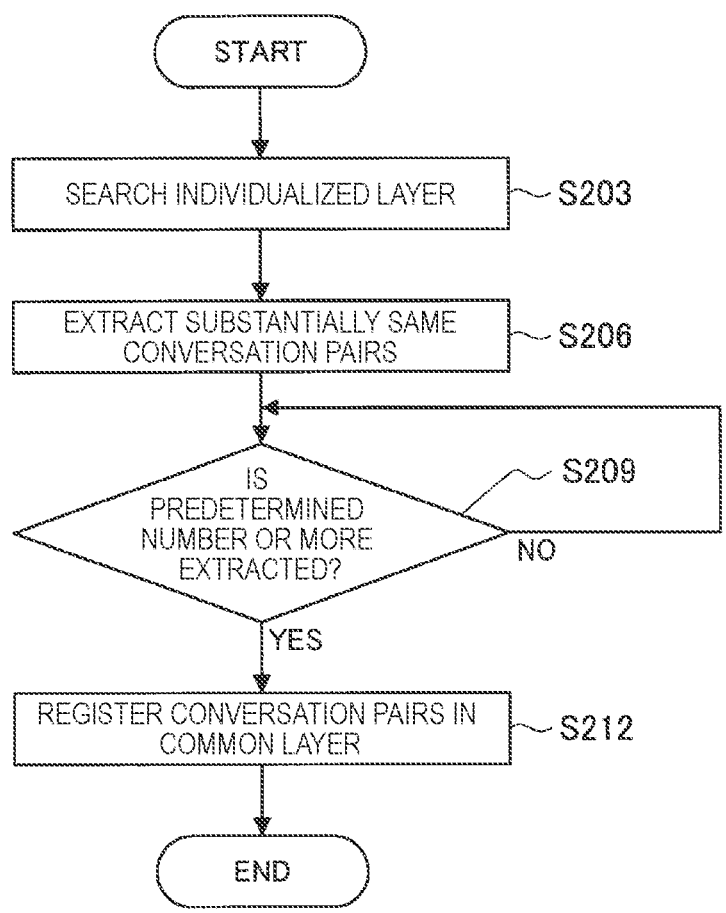
FIG. 10 is a flowchart illustrating a conversation data transition process from an individualized layer to a common layer according to the embodiment.

Next, conversation data transition from an individualized layer to a common layer will be described with reference to FIG. 10. FIG. 10 is a flowchart illustrating conversation data transition process from an individualized layer to a common layer according to the embodiment. Herein, for example, the conversation data transition process from the individualized layer 331A to the common layer 332A of the character A dialogue processing unit 32 will be described.

As illustrated in FIG. 10, the character A dialogue processing unit 32 first searches the individualized layer 331A for each user periodically (step S203) and extracts conversation pairs with substantially the same content (the pair of question sentence data and answer sentence data) (step S206). For the conversation pairs with the substantially same content, for example, a pair of question sentence "Fine?" and answer sentence "Fine today!" and a pair of question sentence "Are you fine?" and answer sentence "Fine today!" can be determined to be the conversation pairs with substantially the same content because the question sentences are different only in a polite expression or not.

Subsequently, when a predetermined number or more of conversation pairs are extracted from the individualized layer 331A for each user (Yes in step S209), the character A dialogue processing unit 32 registers the conversation pairs in the common layer 332A (for each user) (step S212).

In this way, when the conversation pairs with substantially the same content in the individualized layer 331 for each user transition to the common layer 332, the common layer 332 can be extended (the conversation pairs can be expanded).

Figure 11:
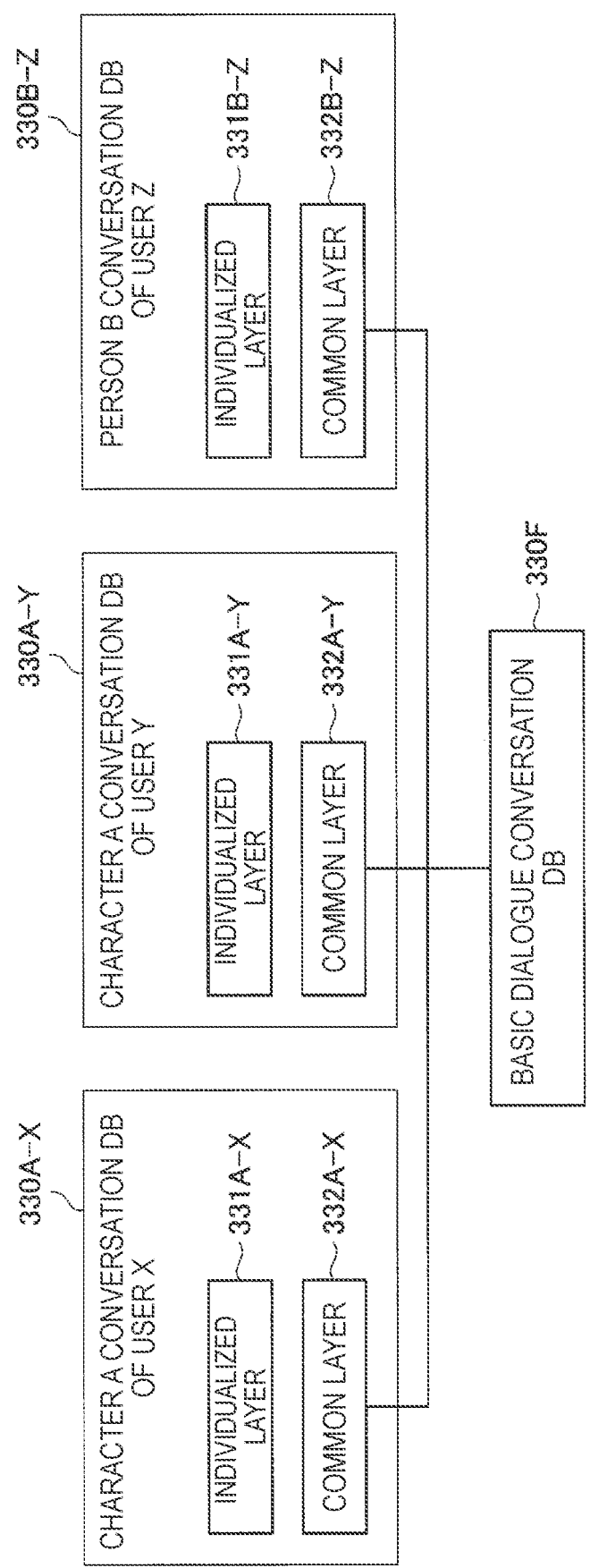
FIG. 11 is an explanatory diagram illustrating transition of conversation data to a basic dialogue conversation DB according to the embodiment.

In addition, in the embodiment, the conversation data can transition from the conversation DB (specifically, the common layer) of the specific agent to the basic dialogue conversation DB, and thus the basic dialogue conversation DB can also be extended. FIG. 11 is an explanatory diagram illustrating transition of conversation data to the basic dialogue conversation DB 330F according to the embodiment. For example, in a case in which the users X and Y each select (purchase) the agent "character A" and a user Z selects (purchases) the agent "person B," as illustrated in FIG. 11, a character A conversation DB 330A-X of the user X, a character A conversation DB 330A-Y of the user Y, and a person B conversation DB 330-Z of the user Z can be in the dialogue processing unit 30. In this case, in individualized layers 331A-X, 331A-Y, and 331B-Z, unique (customized) conversation pairs are gradually registered in accordance with dialogues with the users X, Y, and Z (see FIG. 9). Subsequently, when substantially the same conversation pairs in the same individualized layers 331A-X and 331A-Y become a predetermined number, substantially the same conversation pairs are registered in common layers 332A-X, 332A-Y for the users, respectively (see FIG. 10).

Figure 12:
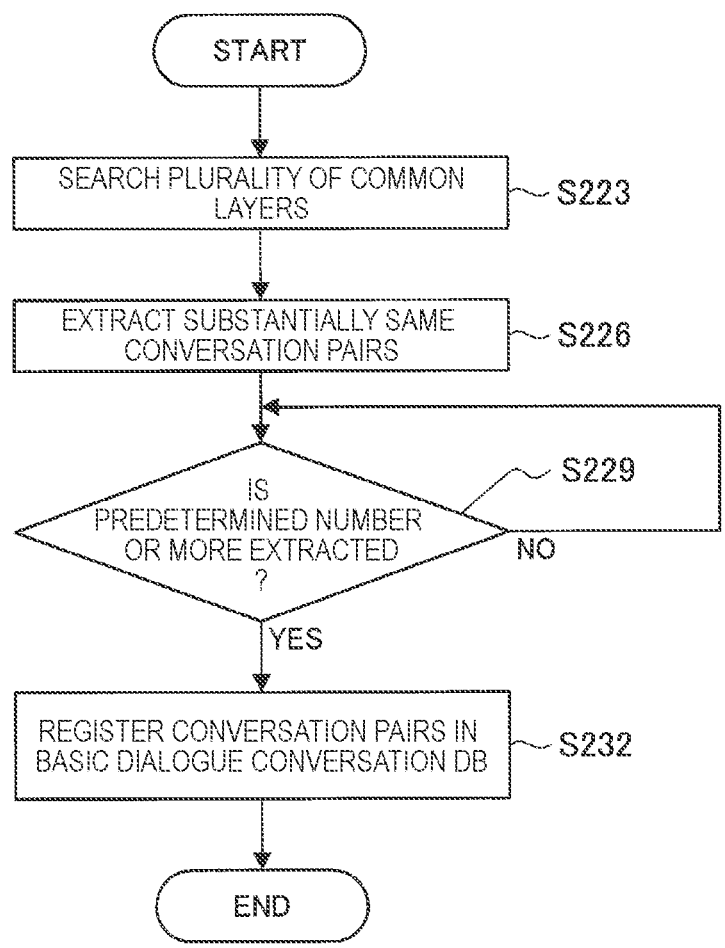
FIG. 12 is a flowchart illustrating a conversation data transition process to a basic dialogue DB according to the embodiment.

Then, in a case in which a predetermined number or more of substantially same conversation pairs are extracted from the common layers 332A-X, 332A-Y, and 332B-Z of the plurality of agents (which may include different agents), the dialogue processing unit 30 causes the conversation pairs to transition to a high-order basic dialogue conversation DB 330F. The basic dialogue conversation DB 330F is a conversation DB included in the basic dialogue processing unit 31. Thus, it is possible to extend the basic dialogue conversation DB 330F (expand the conversation pairs). The data transition process will be described specifically with reference to FIG. 12. FIG. 12 is a flowchart illustrating the conversation data transition process to the basic dialogue DB 330F according to the embodiment.

As illustrated in FIG. 12, the dialogue processing unit 30 first searches the plurality of common layers 332 of the conversation DBs 330 periodically (step S223) and extracts substantially the same conversation pairs (step S226).

Subsequently, when the predetermined number or more of substantially same conversation pairs are extracted from the plurality of common layers 332 (Yes in step S229), the dialogue processing unit 30 registers the conversation pairs in the basic dialogue conversation DB 330F (step S232).

In this way, by causing the conversation pairs with substantially the same content in the common layers 332 of the conversation DBs 330 in the plurality of agents to transition to the basic dialogue conversation DB 330F, it is possible to extend the basic dialogue conversation DB 330F (expand the conversation pairs).

<3-5. Advertisement Output Process>

Next, an advertisement information insertion process by the advertisement insertion processing unit 70 will be described with reference to FIGS. 13 and 14. In the embodiment, the advertisement insertion processing unit 70 can insert advertisement information stored in the advertisement DB 72 into speech of an agent. The advertisement information can be registered in advance in the advertisement DB 72. FIG. 13 is a diagram illustrating an example of advertisement information registered in the advertisement DB 72 according to the embodiment.

As illustrated in FIG. 13, advertisement information 621 includes, for example, an agent ID, a question sentence, advertisement content, a condition, and a probability. The agent ID designates an agent speaking advertisement content, the question sentence designates a question sentence of a user which serves as a trigger and into which advertisement content is inserted, and the advertisement content is an advertisement sentence inserted into dialogue of an agent. In addition, the condition is a condition on which advertisement content is inserted and the probability indicates a probability at which advertisement content is inserted. For example, in an example illustrated in the first row of FIG. 13, in a case in which a word "chocolate" is included in a question sentence from a user who is 30 years old or less in dialogue with the agent "character A," advertisement content "chocolate newly released by "BB company is delicious because milk is contained much" is inserted into the question sentence. In addition, when the advertisement content is inserted every time at the time of speaking the question sentence serving as a trigger, the user feels troublesome. Therefore, in the embodiment, a probability at which the advertisement is inserted may be set. The probability may be decided in accordance with advertisement charges. For example, the probability is set to be higher as the advertisement charges are higher.

The advertisement content insertion process will be described specifically with reference to FIG. 14. FIG. 14 is a flowchart illustrating the advertisement content insertion process according to the embodiment.

Figure 14:
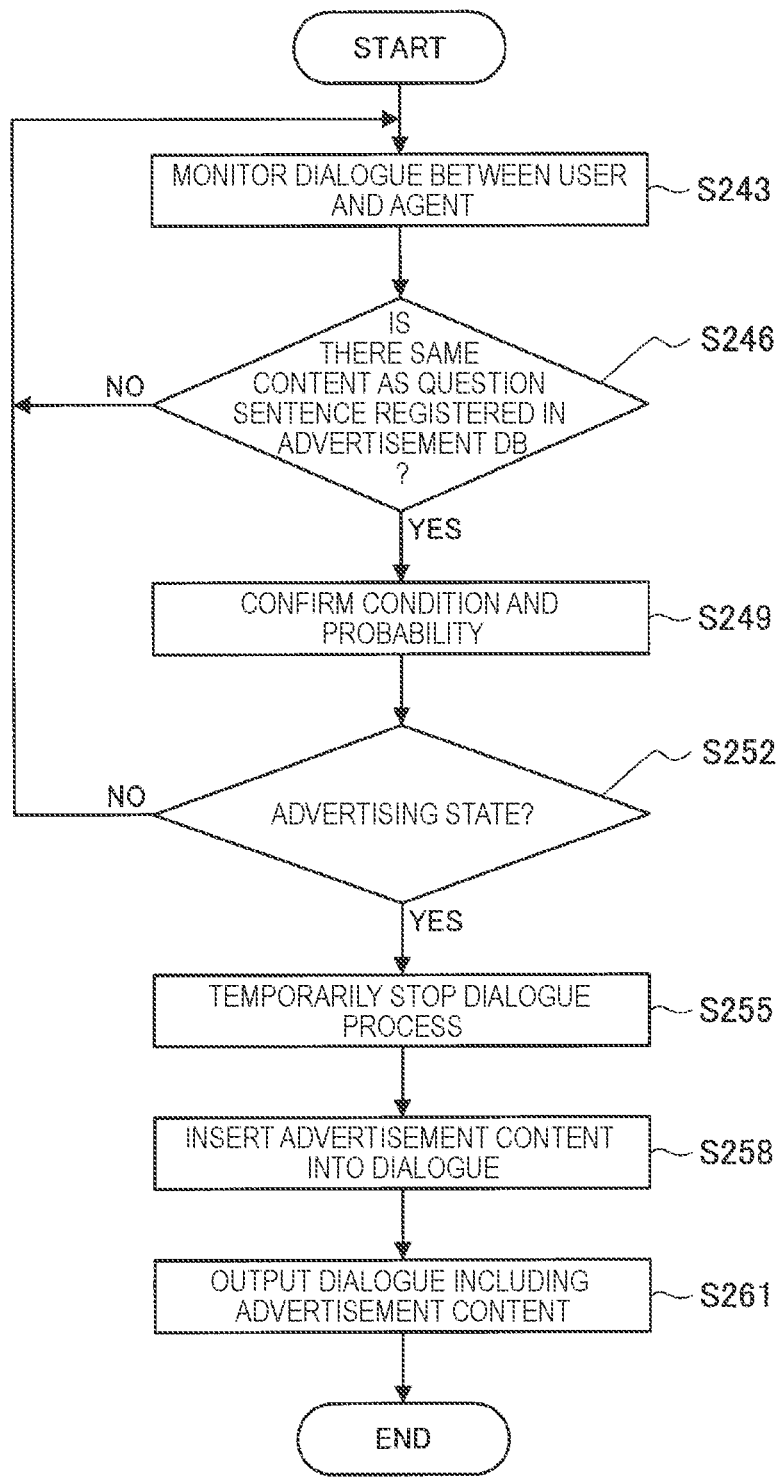
FIG. 14 is a flowchart illustrating an advertisement content insertion process according to the embodiment.

As illustrated in FIG. 14, the advertisement insertion processing unit 70 first monitors dialogue (specifically, a dialogue process by the dialogue processing unit 30) between the user and the agent (step S243).

Subsequently, the advertisement insertion processing unit 70 determines whether a question sentence with the same content as a question sentence registered in the advertisement DB 72 appears in the dialogue between the user and the agent (step S246).

Subsequently, in a case in which the question sentence with the same content appears (Yes in step S246), the advertisement insertion processing unit 70 confirms the condition and the probability of the advertisement insertion associated with the corresponding question sentence (step S249).

Subsequently, the advertisement insertion processing unit 70 determines whether a current state is an advertising state on the basis of the condition and the probability (step S252).

Subsequently, in a case in which the current state is the advertising state (Yes in step S252), the advertisement insertion processing unit 70 temporarily interrupts the dialogue process by the dialogue processing unit 30 (step S255) and inserts the advertisement content into the dialogue (step S258). Specifically, for example, the advertisement content is inserted into an answer sentence of the agent for the question sentence of the user.

Then, the dialogue (conversation sentence data) including the advertisement content is output from the dialogue processing unit 30 to the voice agent I/F 20, is transmitted from the voice agent I/F 20 to the client terminal 1, and is reproduced through voice of the agent (step S261). Specifically, for example, the advertisement content can be presented as a speech of the character A to the user, for example, in the following conversation.

User: "Good morning"

Character A: "Good morning! How are you doing today?"

User: "Fine. I want to eat some delicious food"

Character A: "I heard that grilled meat at CC store is delicious"

In the conversation, the corresponding answer sentence "Good morning! How are you doing today?" retrieved from the conversation DB of the character A is first output as voice in response to the question sentence "Good Morning" of the user. Subsequently, since the question sentence "I want to eat some delicious food" serving as the trigger of the advertisement insertion is included in the question sentence "Fine. I want to eat some delicious food" of the user (see second row of FIG. 13), the advertisement insertion processing unit 70 performs the advertisement insertion process and outputs the answer sentence with the advertisement content "I heard that grilled meat at CC store is delicious" through the voice of the character A.

The conversation data registration process, the phoneme DB generation process, the dialogue control process, the conversation DB updating process, and the advertisement insertion process have been described above as the basic operation processes of the communication control system according to the embodiment.

Note that the dialogue control processing according to the embodiment is not limited to the aforementioned example. The dialogue processing unit 30 can generate a response from the agent by using a conversation frame that leads the user to a predetermined feeling. Hereinafter, specific description will be given with reference to FIGS. 15 to 37.

<<4. Dialogue Control Processing According to First Embodiment>>

<4-1. Generation of Conversation Frame>

First, generation of a conversation frame will be described. The generation of the conversation frame can be performed by a conversation DB generation unit 50. As described above, the conversation DB generation unit 50 according to the embodiment saves conversation sentence data as a pair of question sentence data and answer sentence data assumed in advance. If a predetermined amount (for example, 100 pairs) of the conversation sentence data is collected, the conversation DB generation unit 50 outputs the conversation sentence data as a conversation sentence data set to the dialogue processing unit 30, and the conversation sentence data set is stored in a predetermined conversation DB 330 (see FIG. 4). The generation processing performed by the conversation DB generation unit 50 according to the embodiment is not limited thereto, and it is also possible to generate a conversation frame. Hereinafter, a main configuration of a conversation DB generation unit 50A that generates a conversation frame will be described with reference to FIG. 15.

(4-1-1. Configuration of Conversation DB Generation Unit 50A)

Figure 15:
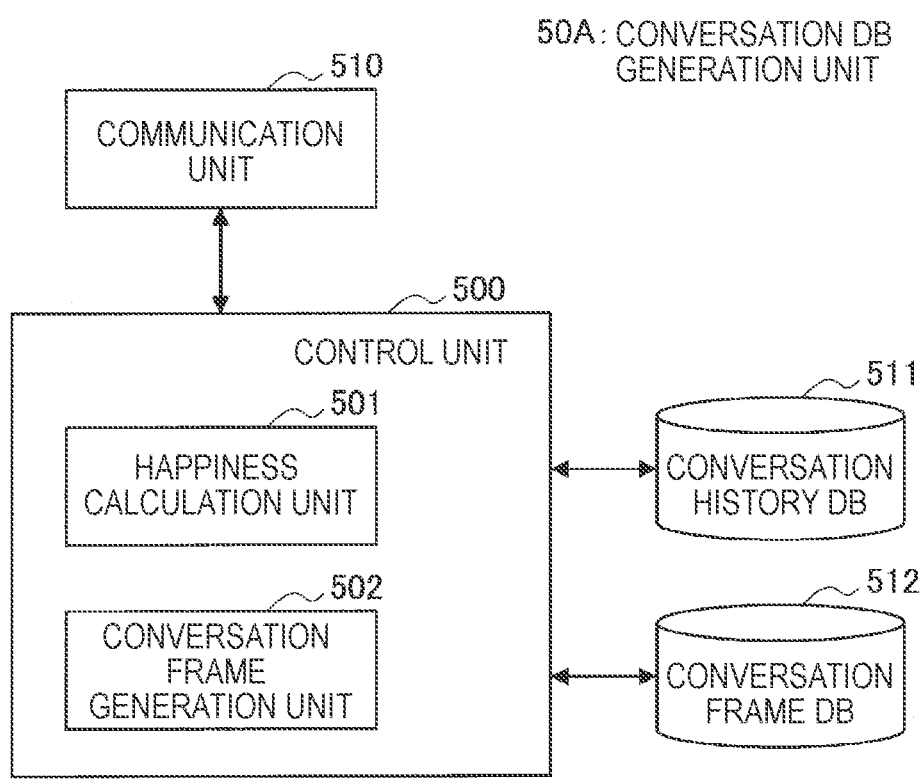
FIG. 15 is a diagram illustrating a configuration example of a conversation DB generation unit according to a first embodiment.

FIG. 15 is a diagram illustrating a configuration example of the conversation DB generation unit 50A according to the first embodiment. As illustrated in FIG. 15, the conversation DB generation unit 50A has a control unit 500, a communication unit 510, a conversation history DB 511, and a conversation frame DB 512.

The communication unit 510 is connected to an external device in a wired or wireless manner and has a function of transmitting and receiving data. For example, the communication unit 510 is connected to the Internet and collects messages exchanged between users and voice conversations from a variety of social media servers and mail servers on the network.

The conversation history DB 511 stores the conversations between the users collected by the communication unit 510. Note that in a case of voice conversations, data obtained by converting the voice conversation into texts by voice analysis may also be accumulated together. The voice analysis of the voice conversations is performed by the control unit 500, for example. In addition, voice conversations between the user and the agent performed via a voice agent I/F 20 and conversation data obtained by changing voice conversations between users into texts may also be accumulated in the conversation history DB 511. Content of the conversation data, dates and times of conversations, IDs of persons who have made conversations, and parameters such as happiness degrees, which will be described later, are linked to each other and stored in the conversation history DB 511.

The control unit 500 functions as an arithmetic processing device and a control device and controls overall operations in the conversation DB generation unit 50A in accordance with a variety of programs. The control unit 500 is realized by an electronic circuit such as a CPU or a microprocessor, for example. In addition, the control unit 500 according to the embodiment functions as a happiness calculation unit 501 and a conversation frame generation unit 502.

The happiness calculation unit 501 calculates how happy an utterer of each conversation feels on the basis of the conversation data accumulated in the conversation history DB 511, links the calculated value as a degree of happiness to the conversation data, and saves the calculated value in the conversation history DB 511. The degree of happiness can be calculated on the basis of characteristic keywords included in the conversation, for example. A detailed method of calculating the degree of happiness will be described later.

The conversation frame generation unit 502 generates a conversation frame that describes a structure of a conversation for leading the user to a predetermined feeling (here, a "feeling of happiness" as an example). For example, the conversation frame generation unit 502 refers to the conversation data accumulated in the conversation history DB 511, extracts a conversation through which the degree of happiness of the utterer increases, generates a conversation frame on the basis of the conversation exchanged chronologically before the increase in the degree of happiness, and accumulates the conversation frame in the conversation frame DB 512. A detailed method of generating the conversation frame will be described later.

The conversation frame generated by the conversation frame generation unit 502 is accumulated in the conversation frame DB 512.

The control unit 500 outputs the conversation frame accumulated in the conversation frame DB 512 to the dialogue processing unit 30. The conversation frame is used when the dialogue processing unit 30 generates a response sentence from the agent.

The specific configuration of the conversation DB generation unit 50A according to the first embodiment has been described above. Next, operation processing performed by the conversation DB generation unit 50A according to the first embodiment will be described.

(4-1-2. Conversation Frame Generation Processing)

Figure 16:
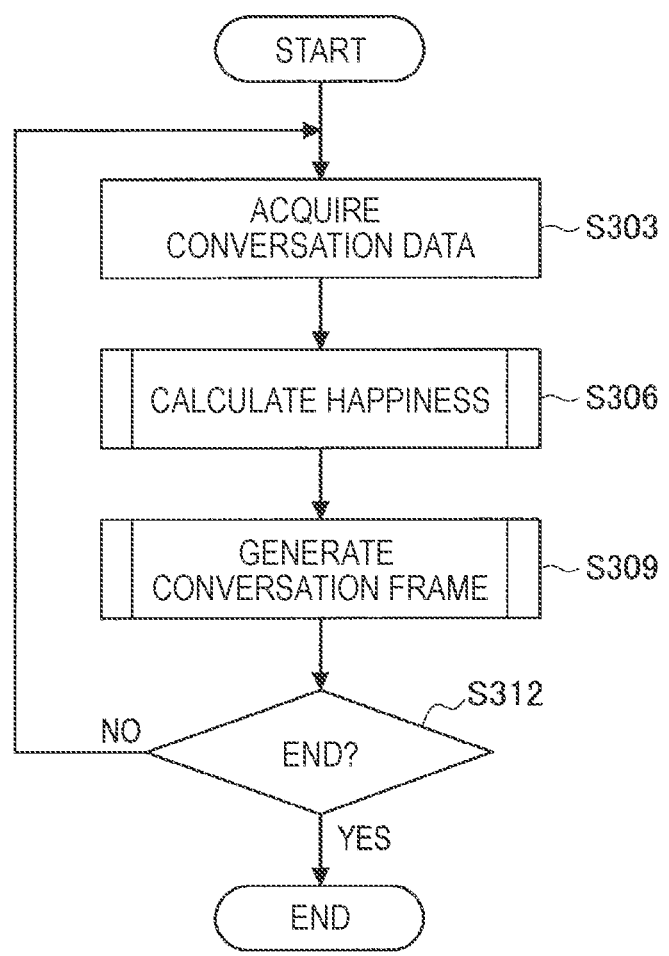
FIG. 16 is a flowchart illustrating conversation frame generation processing according to the first embodiment.

FIG. 16 is a flowchart illustrating conversation frame generation processing according to the first embodiment. As illustrated in FIG. 16, the conversation DB generation unit 50A first acquires conversation data between users from social media on the network, for example, via the communication unit 510 (Step S303). The acquired conversation data is accumulated in the conversation history DB 511.

Next, the happiness calculation unit 501 calculates a degree of happiness of the utterer of each conversation on the basis of the conversation data accumulated in the conversation history DB 511 (Step S306). Although various definitions of the degree of happiness can be considered, "factors for being happy" defined in "Mechanism of Happiness" (Kodansha Gendai Shinsho) written by Takashi Maeno, a professor of a graduate school of Keio University are used as examples in this embodiment. Here, the following four factors are listed as the "factors for being happy".

"Self-fulfillment and growth" factor regarding self-growth and features directed to a person himself/herself in order to achieve a goal "Connection and thankfulness" factor regarding a thankfulness tendency and features directed to other persons "Forward-thinking and optimism" factor indicating that a person is optimistic, positive, and mentally stable "Independence and own pace" factor indicating that a person has defined himself/herself and is characterized by not comparing himself/herself with other persons In this embodiment, larger values of these respective four factors are estimated to indicate that the utterer feels happier. Therefore, a degree of happiness (how happy the utterer feels) can be calculated on the basis of a frequency at which characteristic keywords corresponding to the respective factors are included in conversation data, for example. An example of the characteristic keywords corresponding to the respective factors will be described later with reference to FIG. 18.

The calculated degree of happiness is linked to each conversation and is stored in the conversation history DB 511.

Then, the conversation frame generation unit 502 refers to the degree of happiness of each conversation and generates a conversation frame by which the user has a happy feeling (Step S309). The generated conversation frame is accumulated in the conversation frame DB 512.

Then, Steps S 303 to S309 described above are repeated until an instruction for ending them is provided (Step S312). Steps S303 to S309 described above are periodically (such as once a day or once in six hours) performed, for example.

(4-1-3. Happiness Degree Calculation Processing)

Figure 17:
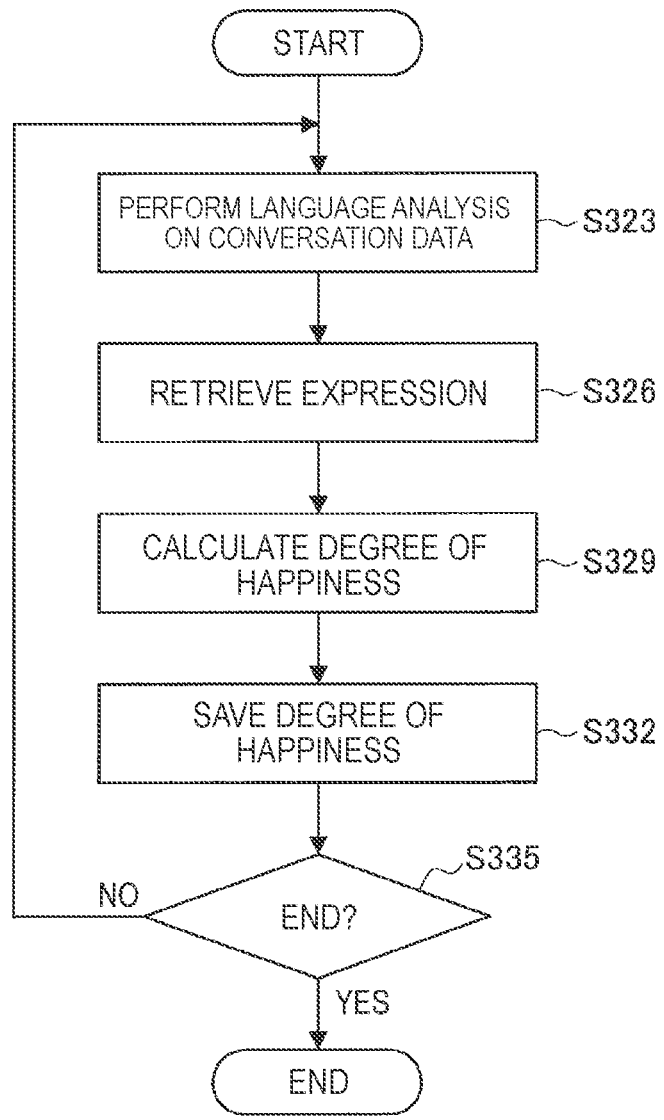
FIG. 17 is a flowchart illustrating happiness degree calculation processing according to the first embodiment.

Next, the happiness degree calculation processing performed in Step S306 described above will be described in detail. FIG. 17 is a flowchart illustrating the happiness degree calculation processing according to the first embodiment.

As illustrated in FIG. 17, the happiness calculation unit 501 first performs language analysis on the conversation data accumulated in the conversation history DB 511 (Step S323). For example, the happiness calculation unit 501 performs morpheme analysis on the conversation data (texts).

Then, the happiness calculation unit 501 performs expression retrieval on the conversation data on the basis of the analysis result (Step S326) and calculates a degree of happiness (Step S329). Here, the "factors of happiness" based on analysis of psychological factors of subjective happiness are used when the degree of happiness indicating how happy the utterer feels is calculated in this embodiment as described above. Specifically, the degree of happiness is calculated on the basis of a frequency at which characteristic keywords corresponding to the four factors, which are the "factors of happiness", are included in the conversation data. Here, an example of evaluation values of the four factors in the characteristic keywords will be shown in FIG. 18. The happiness calculation unit 501, for example, has the table illustrated in FIG. 18.

The four factors illustrated in FIG. 18 are Factor 1: a self-fulfillment and growth factor, Factor 2: a connection and thankfulness factor, Factor 3: a forward-thinking and optimism factor, and Factor 4: an independence and own pace factor. In addition, the evaluation values (that is, happiness degree contribution values) of the four factors are expressed as 0 to 1. In a case in which a keyword (that is, a conversation expression) "self-fulfillment" in the first line is included in conversation data, for example, the evaluation value of the self-fulfillment and growth factor (Factor 1) is "1" while the evaluation values of the other factors are "0". In addition, in a case in which a keyword of "Thank you" in the fourth line is included in conversation data, the evaluation value of the connection and thankfulness factor (Factor 2) is "1" while the evaluation values of the other factors are "0".

Therefore, the happiness calculation unit 501 retrieves all expressions (keywords) included in the table illustrated in FIG. 18 from the conversation data on the basis of the result of the morpheme analysis (word extraction) of the conversation data and obtains a vector of a degree of happiness obtained by adding the contribution values of the respective factors for each discovered expression. If it is assumed that the contribution value of each factor is $f_{1\ to\ 4}$, the vector of the degree of happiness is obtained by the following Equation 1.

[Math. 1]

$$\text{happiness} = [\Sigma_i f_{1i}, \Sigma_i f_{2i}, \Sigma_i f_{3i}, \Sigma_i f_{4i}] \quad \text{Equation 1}$$

For example, the expression "Thank you" in the table for the happiness degree contribution values is included in conversation data "Not really great, but thank you", and the happiness degree contribution value is happiness=[0, 1, 0, 0] (the value of Factor 2 is "1") referring to the table illustrated in FIG. 18.

Then, the happiness calculation unit 501 saves the calculated degree of happiness as metadata of conversation data in the conversation history DB 511 (Step S332). Here, FIG. 19 illustrates an example of conversation data accumulated in the conversation history DB 511. The conversation data is data to which conversation IDs, dates and times of conversations, IDs of persons who have made conversation, texts (content of conversations), and degrees of happiness are linked. Since the conversation ID: C02-03 illustrated in FIG. 19 includes a characteristic keyword "plan" in content of the conversation, the value of Factor 1 is determined to be "0.5" referring to the table illustrated in FIG. 18, and the happiness degree contribution value is evaluated as happiness=[0.5, 0, 0, 0].

Then, Steps S323 to S332 described above are repeated until an instruction for ending them is provided (Step S335). Steps S323 to S332 described above are periodically (such as once a day or once in six hours) performed, for example.

(4-1-4. Conversation Frame Generation Processing)

Figure 20:
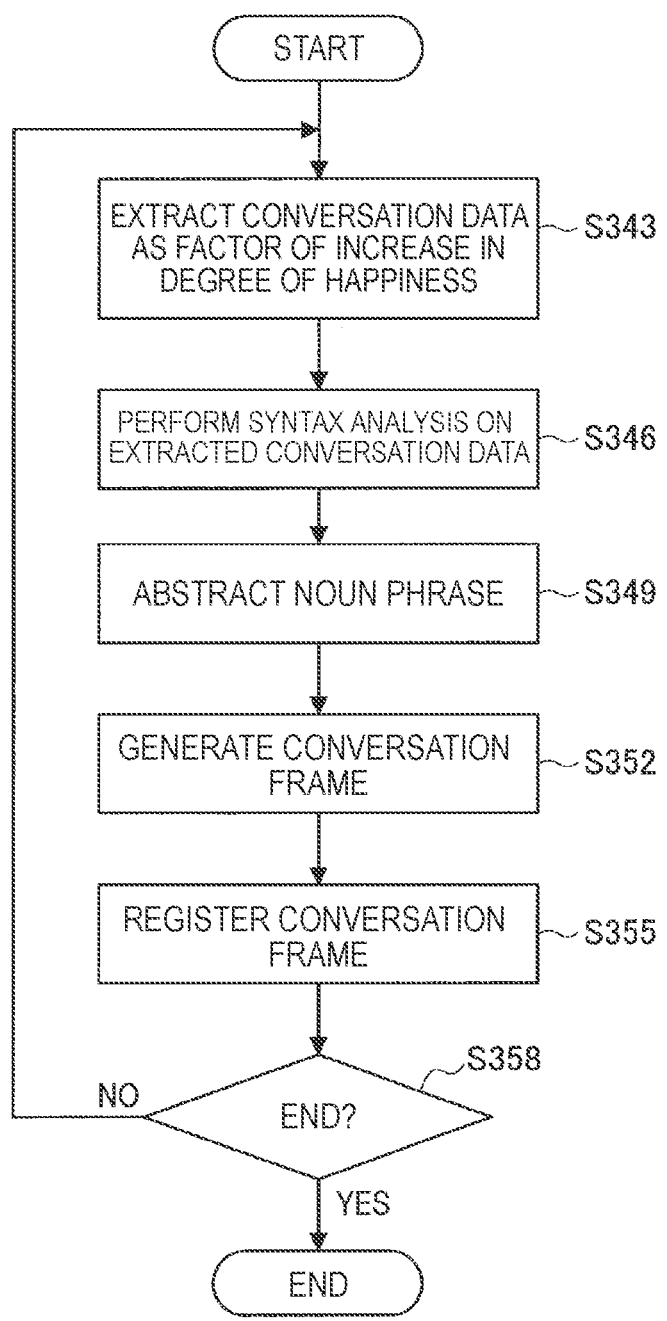
FIG. 20 is a flowchart illustrating conversation frame generation processing according to the first embodiment.

Next, the conversation frame generation processing performed in Step S309 described above will be described in detail. FIG. 20 is a flowchart illustrating the conversation frame generation processing according to the first embodiment.

As illustrated in FIG. 20, the conversation frame generation unit 502 first extracts conversation data that has become a factor of an increase in the degree of happiness from the conversation history DB 511 (Step S343). Specifically, in a case in which a degree of happiness of conversation data of the same utterer ID has increased in a series of conversations in the conversation data accumulated in the conversation history DB 511, the conversation frame generation unit 502 extracts conversation data exchanged immediately before conversation data due to which the degree of happiness has increased. A predetermined threshold value, for example, may be used to determine the increase in the degree of happiness. For example, if the degree of happiness [0, 0, 0, 0] of the conversation ID: C01-01 and the degree of happiness [0, 1, 0, 0] of the conversation ID: C01-03 of the utterer ID: U01 are compared in an exemplary conversation (conversation ID: C01, for example) in the conversation data illustrated in FIG. 19, it is possible to recognize that the degree of happiness has increased by "1". In this case, the conversation frame generation unit 502 extracts the conversation data exchanged immediately before the conversation data due to which the degree of happiness has increased, that is, the conversation data (utterer ID: U01) of the conversation ID: C01-01 and the conversation data (utterer ID: U02) of the conversation ID: C01-02.

Note that in a case in which a feeling value (a value indicating a feeling) calculated on the basis of the characteristic keywords indicating feelings (hereinafter, abbreviated as "feeling words") included in the conversation data is applied to each conversation data item, a conversation due to which not only the degree of happiness but also the feeling value have increased may be extracted. Such a feeling value can be calculated when the happiness calculation unit 501 calculates the degree of happiness. The happiness calculation unit 501 has a feeling value table indicating feeling values of each feeling word, retrieves feeling words included in conversation data from a result of morpheme analysis of the conversation data, and in a case in which feeling words are included, the happiness calculation unit 501 calculates the feeling value of the conversation data by adding the feeling values of the felling words. Note that examples of the feeling words include positive/negative modifying words and interjections.

The extraction of conversation data that is a factor of an increase in a degree of happiness has been described above.

Next, the conversation frame generation unit 502 performs syntax analysis on the extracted conversation data (Step S346). Specifically, the conversation frame generation unit 502 divides a character string of the extracted conversation data into morphemes and analyzes grammatical relationships (a subject—a verb, a modifying word—a modified word, and the like) between words.

Then, the conversation frame generation unit 502 abstracts a noun phrase in extracted conversation data on the basis of the result of the syntax analysis (Step S349) and generates a conversation frame including a verb and the abstracted noun phrase (Step S352). Note that in a case in which the noun phrase includes an adjective, a value in accordance with a feeling value of the corresponding adjective (a feeling value 1: "positive", a feeling value—1: "negative", and a feeling value 0: "neutral") may be included in the conversation frame with reference to the feeling value table of adjectives as illustrated in FIG. 21. Hereinafter, specific examples of generation of a conversation frame will be described.

In a case in which extracted conversation data includes "I made a tasty gratin yesterday!" (conversation ID: C01-01) and "You can make a tasty gratin. That sounds great." (conversation ID: C01-02), for example, the conversation frame generation unit 502 performs syntax analysis on each conversation data item, abstracts the common noun phrase ("tasty gratin (an adjective+a noun)" here), and generates a conversation frame as follows.

Condition frame: "I made a <adjective: positive> <noun>"
Response frame: "You can make a <adjective: positive> <noun>. That sounds great!"

The conversation frame includes a "condition (condition frame)" and a "response (response frame)" in which the conversation frame is used as described above. In addition, a value in accordance with a feeling value of the adjective (the value "positive" corresponding to the feeling value "1" of "tasty" here) is also included in the conversation frame. In this manner, it is possible to recognize that the conversation frame is used as a response to an utterance indicating that the utterer has made a positive object.

Then, the conversation frame generation unit 502 registers the generated conversation frame in the conversation frame DB 512 (Step S355). Here, an example of the conversation frame registered in the conversation frame DB 512 is illustrated in FIG. 22. As illustrated in FIG. 22, a frame ID has been applied to each conversation frame.

Then, Steps S343 to S355 described above are repeated until an instruction for ending them is provided (Step S358). Steps S343 to S355 described above are periodically (such as once a day or once in six hours) performed, for example.

<4-2. Generation of Response Sentence>

Next, generation of a response sentence by using a conversation frame according to the first embodiment will be described. The conversation DB generation unit 50A according to the embodiment generates conversation frames as described above, and if the number of conversation frames reaches a predetermined number (100 sets, for example), the conversation DB generation unit 50A outputs the conversation frames as a data set to the dialogue processing unit 30. The dialogue processing unit 30 uses the conversation frames generated in advance when a response (answer voice) of the agent is generated in response to the utterance (question voice) of the user input via the voice agent I/F 20. Here, a specific configuration and operation processing of the dialogue processing unit 300A that generates a response by using such conversation frames will be described. Note that the configuration of the dialogue processing unit 300A is common to those of a basic dialogue processing unit 31, a character A dialogue processing unit 32, a person B dialogue processing unit 33, and a person C dialogue processing unit 34.

(4-2-1. Configuration of dialogue processing unit 300A)

Figure 23:
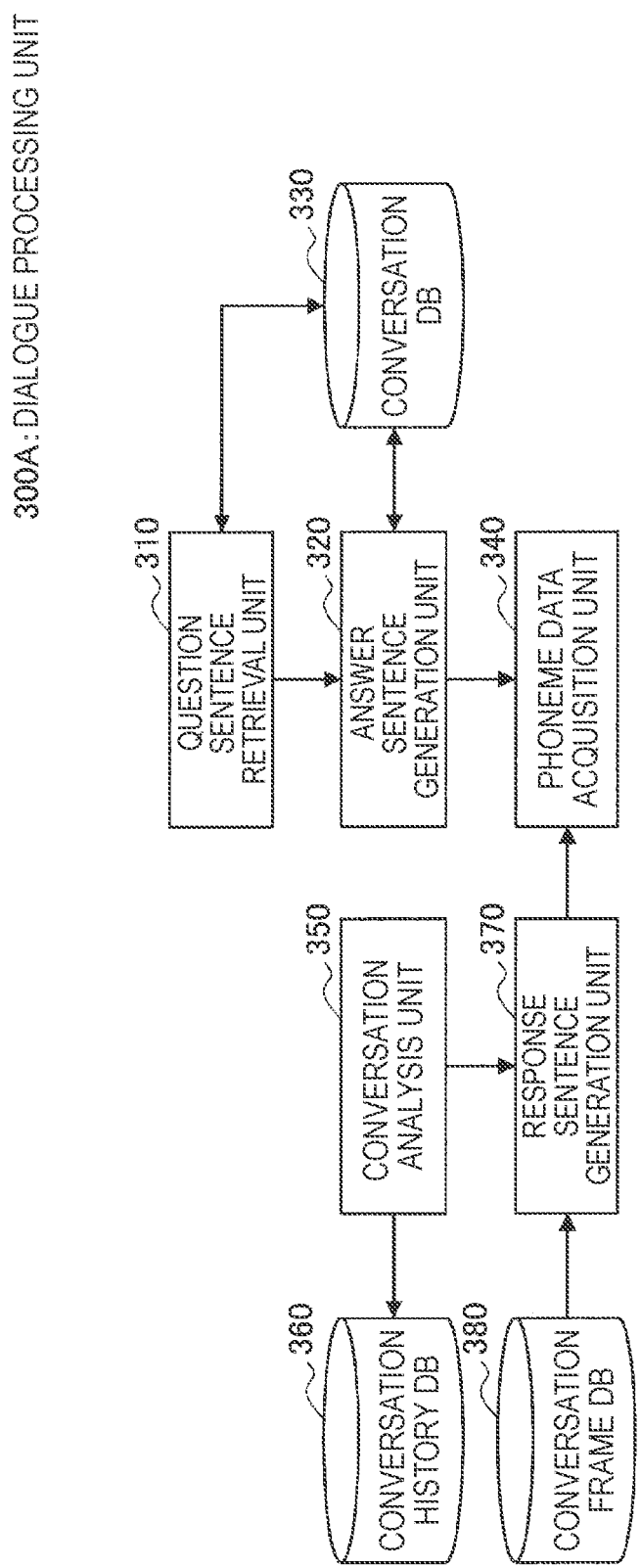
FIG. 23 is a diagram illustrating a configuration example of a dialogue processing unit according to the first embodiment.

FIG. 23 is a diagram of a configuration example of the dialogue processing unit 300A according to the first embodiment. As illustrated in FIG. 23, the dialogue processing unit 300A has a question sentence retrieval unit 310, an answer sentence generation unit 320, a conversation DB 330, a phoneme data acquisition unit 340, a conversation analysis unit 350, a conversation history DB 360, a response sentence generation unit 370, and a conversation frame DB 380.

Since the question sentence retrieval unit 310, the answer sentence generation unit 320, the conversation DB 330, and the phoneme data acquisition unit 340 are similar to configurations with the same reference numerals described above with reference to FIG. 4, description thereof will be omitted here.

The conversation analysis unit 350 acquires a conversation sentence of the user that has been acquired by the voice agent I/F 20 and has been changed into texts and performs syntax analysis. Note that the conversation analysis unit 350 may accumulate the conversation sentence in the conversation history DB 360. The conversation sentence accumulated in the conversation history DB 360 is collected by the conversation DB generation unit 50A.

The response sentence generation unit 370 retrieves a conversation frame with coincident syntax from the conversation frame DB 380 on the basis of the result of analysis performed by the conversation analysis unit 350. A data set of the conversation frames accumulated in the conversation frame DB 512 of the conversation DB generation unit 50A is saved in the conversation frame DB 380. The conversation frames saved in the conversation frame DB 380 may be periodically updated by the conversation DB generation unit 50A.

In a case in which a conversation sentence of the user is "I did it! I made beautiful flower arrangement!", for example, the response sentence generation unit 370 retrieves a condition (utterance condition frame) that coincides with a result of syntax analysis "I did it! I made a <adjective: positive> <noun>!" for abstracting a noun phrase from the conversation frame DB 380. In a case in which conversation frames as illustrated in FIG. 22 are saved, for example, the condition frame of the frame ID: F01 coincides with this condition. Therefore, the response sentence generation unit 370 generates "You can make beautiful flow arrangement. That sounds great!" as response sentence data by using a response frame "You can make a <adjective: positive> <noun>. That sounds great!" corresponding to the condition frame. Note that in a case in which a plurality of condition frames are retrieved, a condition frame that is retrieved first may be selected, or a condition frame may be randomly selected from among all the retrieved condition frames.

The response sentence data generated by the response sentence generation unit 370 is output to the phoneme data acquisition unit 340, and phonemes of a specific agent are acquired by the phoneme data acquisition unit 340, and the response sentence data and the phoneme data are output to the voice agent I/F 20. Then, the response sentence data is vocalized as voice of the specific agent by the voice agent I/F 20 and is output as a speech of the specific agent from the client terminal 1.

The configuration of the dialogue processing unit 300A according to the first embodiment has been described above. Next, operation processing of the dialogue processing unit 300A according to the embodiment will be described.

(4-2-2. Response Processing)

Figure 24:
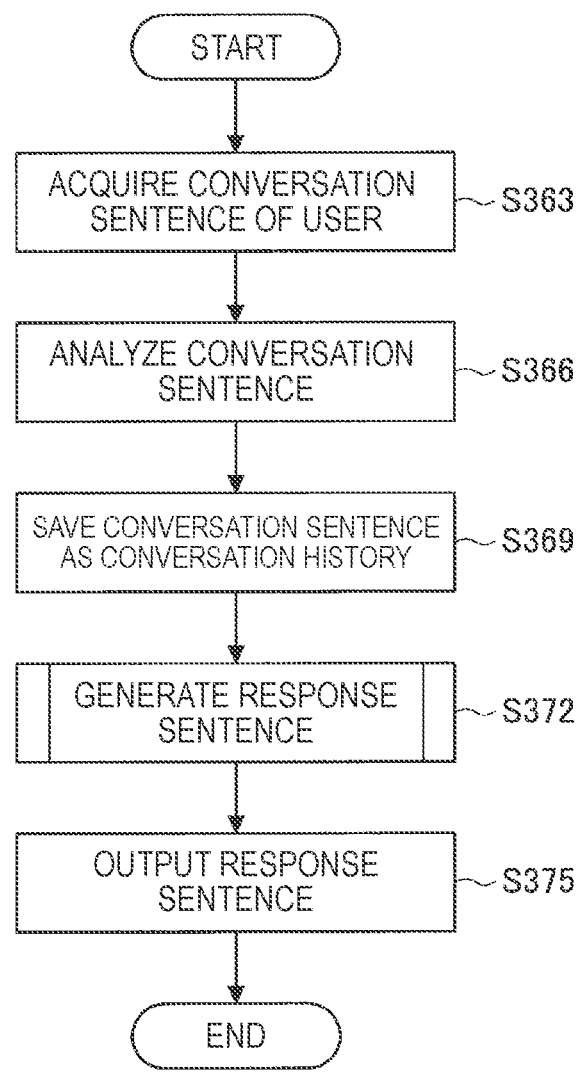
FIG. 24 is a flowchart illustrating response processing according to the first embodiment.

FIG. 24 is a flowchart illustrating response processing according to the first embodiment. As illustrated in FIG. 24, the conversation analysis unit 350 first acquires a conversation sentence of the user that has been acquired by the voice agent I/F 20 and has been changed into texts (Step S363).

Then, the conversation analysis unit 350 performs syntax analysis on the conversation sentence (Step S366).

Then, the conversation analysis unit 350 saves the conversation sentence as a conversation history in the conversation history DB 360 (Step S369).

Then, the response sentence generation unit 370 generates response sentence data on the basis of the result of the analysis performed by the conversation analysis unit 350 and with reference to the conversation frame DB 380 (Step S372). Details of the response sentence generation processing will be described later.

Then, the response sentence generation unit 370 outputs the generated response sentence data to the phoneme data acquisition unit 340 (Step S375).

(4-2-3. Response sentence generation processing)

Figure 25:
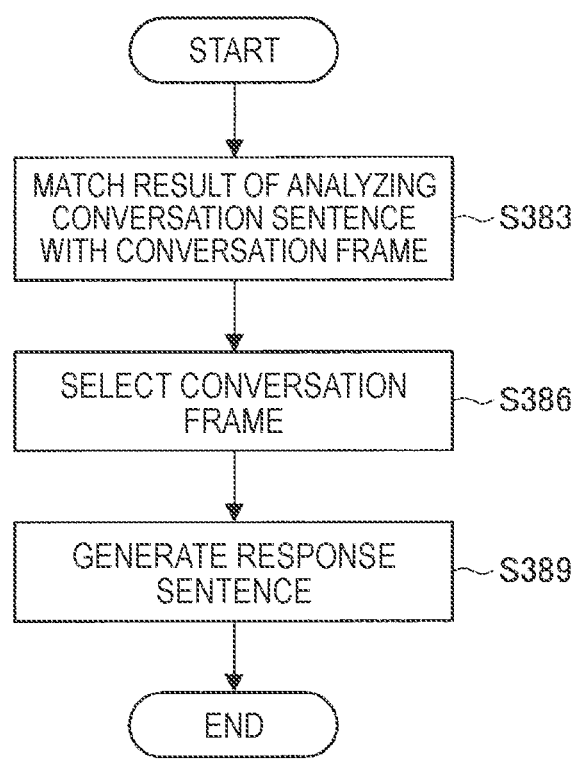
FIG. 25 is a flowchart illustrating response sentence generation processing according to the first embodiment.

Then, the response sentence generation processing in Step S372 described above will be described with reference to FIG. 25. FIG. 25 is a flowchart illustrating response sentence generation processing according to the first embodiment.

As illustrated in FIG. 25, the response sentence generation unit 370 first matches the result of analyzing the conversation sentence by the conversation analysis unit 350 and the conversation frames saved in the conversation frame DB 380 (Step S383).

Then, the response sentence generation unit 370 selects a conversation frame that includes a condition frame that matches the result of analyzing the conversation sentence (Step S386).

Then, the response sentence generation unit 370 generates response sentence data by using the response frame of the selected conversation frame (Step S389).

(4-2-4. Response Sentence Output Processing)

Figure 26:
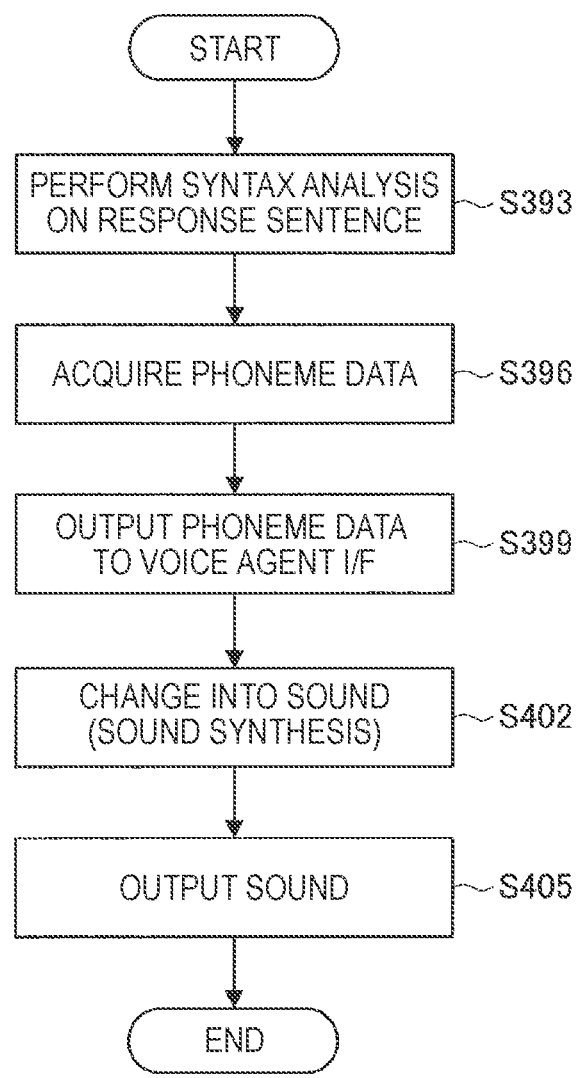
FIG. 26 is a flowchart illustrating response sentence data output processing according to the first embodiment.

Next, processing of outputting response sentence data generated by the response sentence generation unit 370 will be described with reference to FIG. 26. FIG. 26 is a flowchart illustrating response sentence data output processing according to the first embodiment.

As illustrated in FIG. 26, the phoneme data acquisition unit 340 first performs syntax analysis on response sentence data generated by the response sentence generation unit 370 (Step S393) and acquires phoneme data of a specific agent corresponding to the respective elements (Step S396).

Next, the phoneme data acquisition unit 340 outputs the acquired phoneme data and the response sentence data to the voice agent I/F 20 (Step S399).

Then, the voice agent I/F 20 generates a voice spectrum from the phoneme data and vocalizes the response sentence data (voice synthesis) (Step S402).

Then, the voice agent I/F 20 transmits the generated response voice to the client terminal 1, and the response voice is output by the client terminal 1 (Step S405).

<<5. Dialogue Control Processing According to Second Embodiment>>

<5-1. Generation of Conversation Frame>

In the aforementioned first embodiment, the method of extracting a degree of happiness (how happy the utterer feels) of the conversation data from the conversation DB 511 in generation of the conversation frame and learning the conversation frame when the degree of happiness has increased has been described.

Here, persons have respective attributes, and there are cases in which conversations that make the persons happy differ. Thus, the second embodiment makes it possible to generate a response to a user by using a conversation frame in accordance with an attribute of the user and provide a more effective response by analyzing the attribute of the person who has made the conversation and learning the conversation frame for each attribute.

Figure 27:
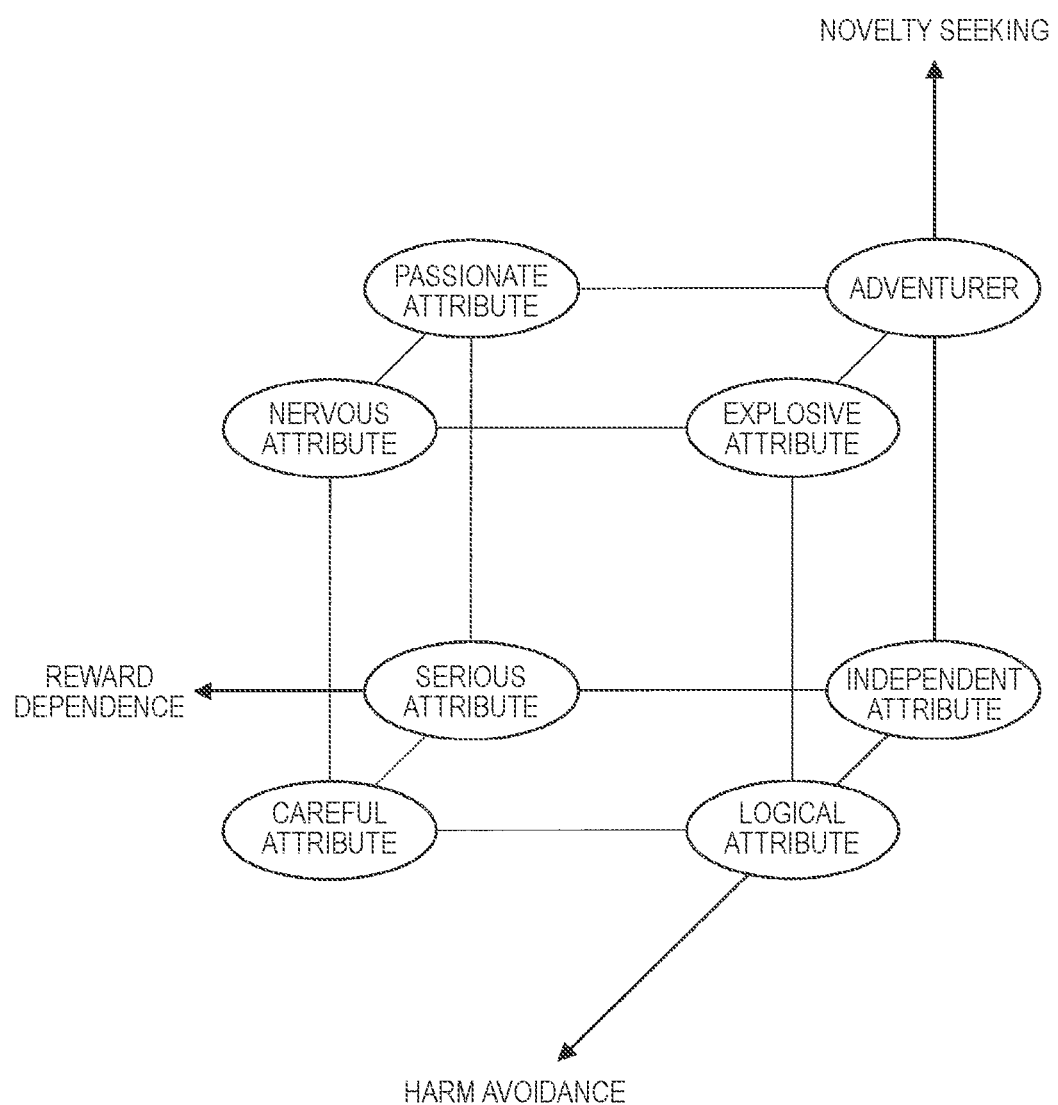
FIG. 27 is a diagram explaining a three-dimensional space by temperament parameters.

First, definitions of attributes in the embodiment will be described. Two ideas, namely typology and a characteristic theory are used to explain attributes of persons. Attributes are explained by some typical types according to the typology while attributes are explained as combinations of some characteristics according to the characteristic theory. In addition, the personalities that are attributes in a broad sense may be classified into a congenital temperament and an acquired temperament. In the embodiment, a personality theory that is a characteristic theory suggested by Robert Cloninger is used as an example. According to such a personality theory, attributes are classified on the basis of a total of seven characteristics, namely four temperament parameters "novelty seeking, reward dependence, harm avoidance, and persistence" and three attribute parameters "self-directedness, cooperativeness, and self-transcendence" (seven-dimensional personality model). For relevance between the respective features of the temperament parameters and neurotransmitters, there has been a study which demonstrates that the novelty seeking is relevant to dopamine that is a neurotransmitter, reward dependence is relevant to norepinephrine, and harm avoidance is relevant to serotonin. In the embodiment, a three-dimensional space along axes of three temperament parameters, namely novelty seeking, reward dependence, and harm avoidance is considered, and attributes are classified into eight attributes (adventurer, an explosive attribute, a passionate attribute, a nervous attribute, an independent attribute, a logical attribute, a serious attribute, and a careful attribute) depending on how large the values of the respective axes are, as illustrated in FIG. 27.

(5-1-1. Configuration of Conversation DB Generation Unit 50A)

Figure 28:
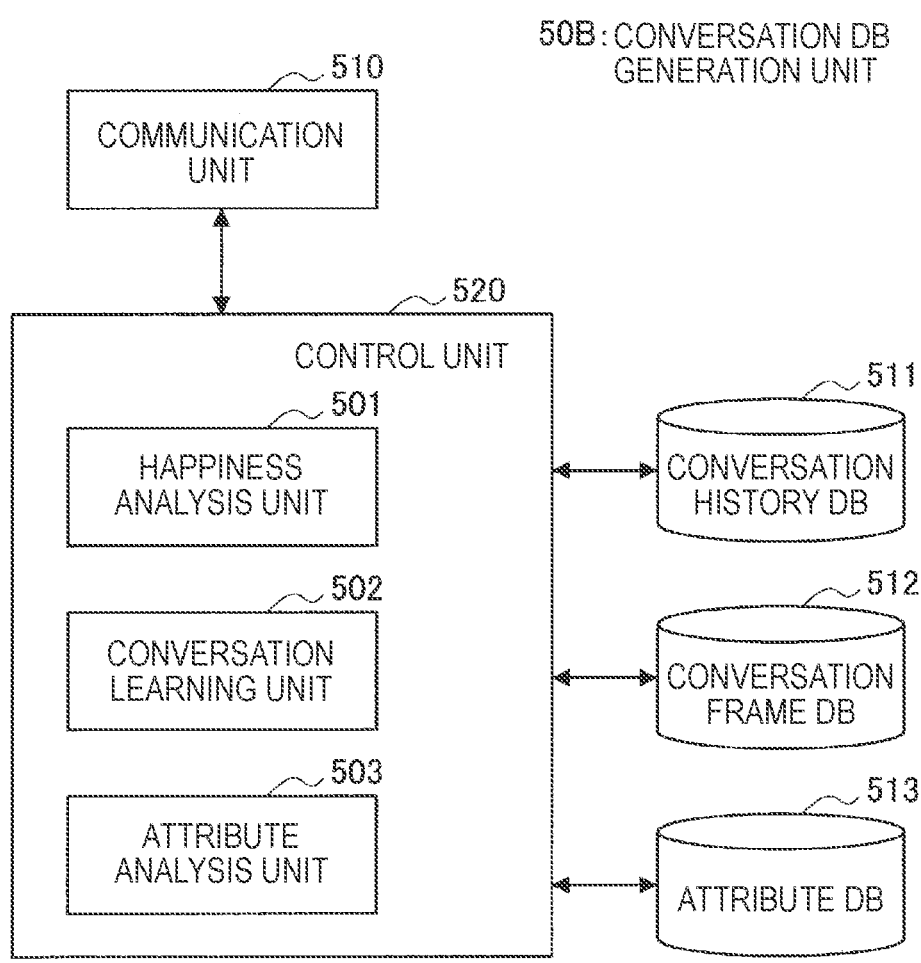
FIG. 28 is a diagram illustrating a configuration example of a conversation DB generation unit according to a second embodiment.

Next, a main configuration of a conversation DB generation unit 50B that generates a conversation frame will be described with reference to FIG. 28. FIG. 28 is a diagram illustrating a configuration example of the conversation DB generation unit 50B according to the second embodiment. As illustrated in FIG. 28, the conversation DB generation unit 50B has a control unit 520, a communication unit 510, a conversation history DB 511, a conversation frame DB 512, and an attribute DB 513.

Since the communication unit 510, the conversation history DB 511, and the conversation frame DB 512 are similar to the configurations with the same reference numerals in the first embodiment described with reference to FIG. 15, description thereof will be omitted here.

The control unit 520 functions as an arithmetic processing device and a control device and controls overall operations in the conversation DB generation unit 50B in accordance with a variety of programs. The control unit 520 is realized by an electronic circuit such as a CPU or a microprocessor, for example. In addition, the control unit 520 according to the embodiment functions as the happiness calculation unit 501, the conversation frame generation unit 502, and the attribute analysis unit 503.

Functions of the happiness calculation unit 501 and the conversation frame generation unit 502 are similar to those of the configurations with the same reference numerals in the first embodiment described with reference to FIG. 15.

The attribute analysis unit 503 refers to the conversation data accumulated in the conversation history DB 511 and calculates an attribute parameter of the utterer of each conversation data item. The calculated attribute parameter is linked with the conversation data and is accumulated in the conversation history DB 511. In addition, the attribute analysis unit 503 extracts the attribute parameter of the conversation data of each utterer ID from the conversation history DB 511, analyzes an attribute type of each utterer ID on the basis of the attribute parameter, and accumulates the attribute type in the attribute DB 513. Details of the attribute analysis will be described later.

Information related to the attribute type of each utterer, which has been analyzed by the attribute analysis unit 503, is accumulated in the attribute DB 513

The specific configuration of the conversation DB generation unit 50B according to the second embodiment has been described above. Next, operation processing of the conversation DB generation unit 50B according to the second embodiment will be described.

(5-1-2. Conversation Frame Generation Processing)

Figure 29:
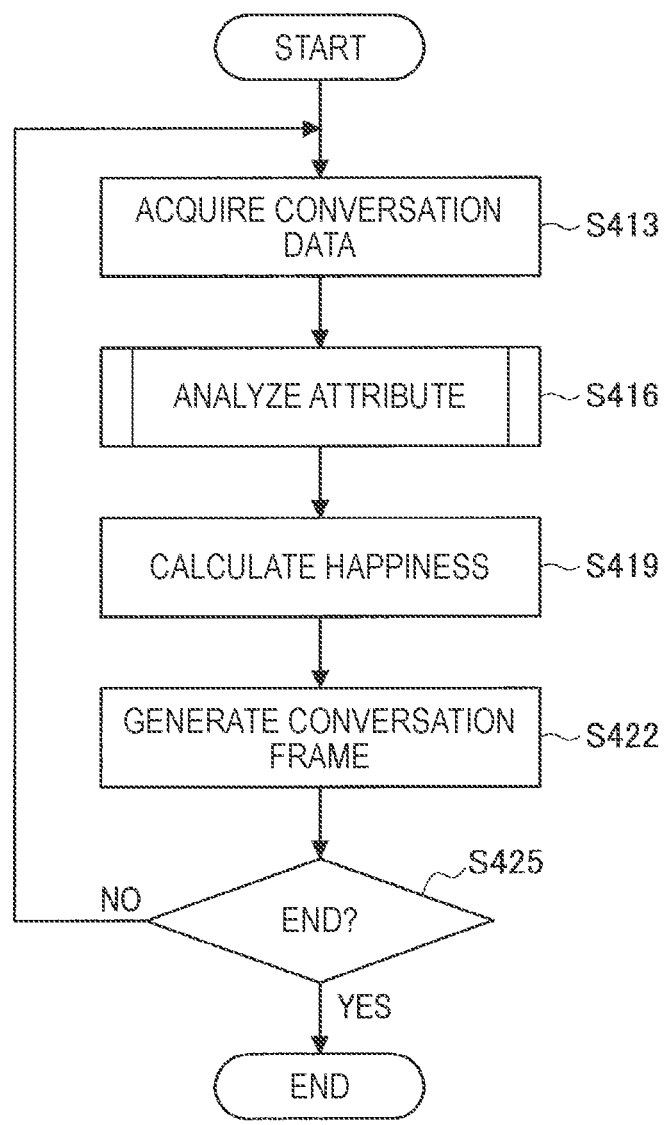
FIG. 29 is a flowchart illustrating conversation frame generation processing according to the second embodiment.

FIG. 29 is a flowchart illustrating conversation frame generation processing according to the second embodiment. As illustrated in FIG. 16, the conversation DB generation unit 50A first acquires conversation data between users from social media on the network, for example, via the communication unit 510 (Step S413). The acquired conversation data is accumulated in the conversation history DB 511.

Then, the attribute analysis unit 503 calculates an attribute parameter of the utterer of each conversation on the basis of the conversation data accumulated in the conversation history DB 511 (Step S416). The calculated attribute parameter is linked to the conversation data and is saved in the conversation history DB 511. Calculation of the attribute parameter will be described in detail with reference to FIG. 30.

Next, the happiness calculation unit 501 calculates a degree of happiness of the utterer of each conversation on the basis of the conversation data accumulated in the conversation history DB 511 (Step S419). The calculated degree of happiness is linked to the conversation data and is saved in the conversation history DB 511. Calculation of the degree of happiness is as described above with reference to FIG. 17.

Then, the conversation frame generation unit 502 refers to the degree of happiness of each conversation and generates a conversation frame that gives the user a happy feeling (Step S422). The generated conversation frame is accumulated in the conversation frame DB 512. Generation of the conversation frame is as described above with reference to FIG. 20. Note that am attribute type for which use of the conversation frame is considered to be appropriate is linked as metadata in the second embodiment. Specifically, the conversation frame generation unit 502 acquires the attribute type of the utterer ID, the degree of happiness of which has increased, in the conversation data used when the conversation frame is generated, from the attribute DB 513 and links the attribute type as metadata to the generated conversation frame.

Then, Steps S413 to S422 described above are repeated until an instruction for ending them is provided (Step S425). Steps S413 to S422 described above are periodically (such as once a day or once in six hours) performed, for example.

(5-1-3. Attribute Analysis Processing)

Figure 30:
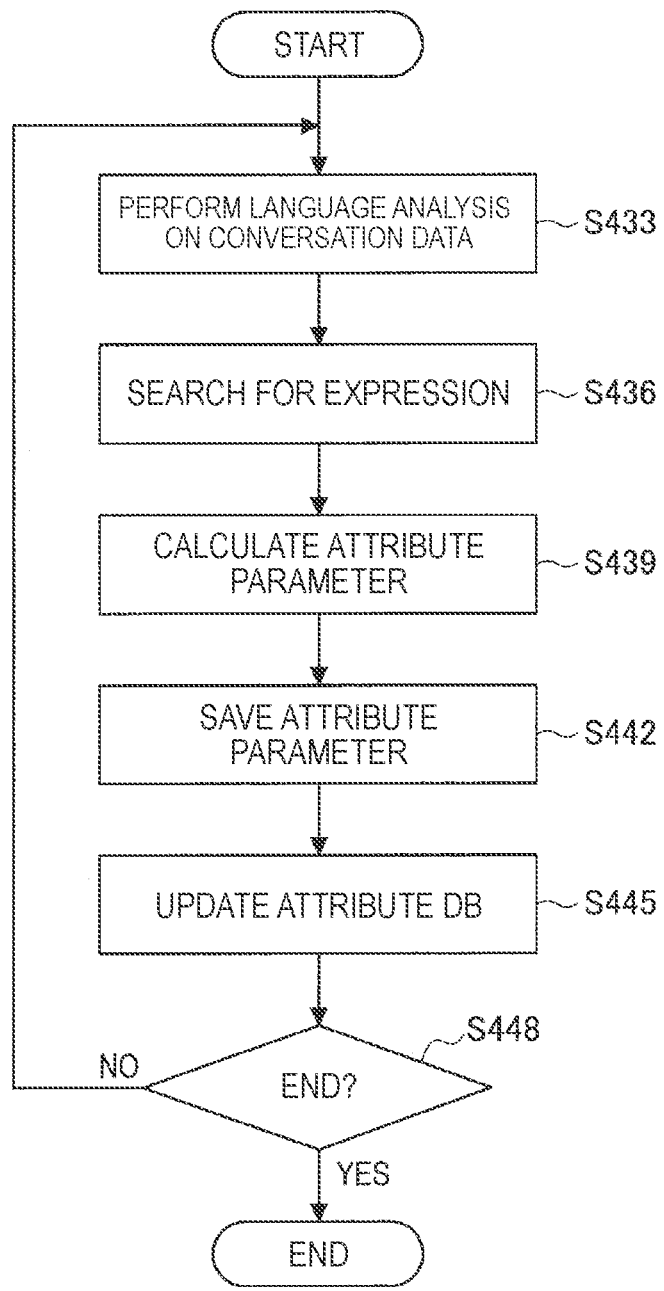
FIG. 30 is a flowchart illustrating attribute analysis processing according to the second embodiment.

Next, attribute analysis processing performed in Step S416 described above will be described in detail. FIG. 30 is a flowchart illustrating the attribute analysis processing according to the second embodiment.

As illustrated in FIG. 30, the attribute analysis unit 503 first performs language analysis on the conversation data accumulated in the conversation history DB 511 (Step S433). For example, the attribute analysis unit 503 performs morpheme analysis on the conversation data (texts).

Then, the attribute analysis unit 503 performs expression retrieval on the conversation data on the basis of the result of the analysis (Step S436) and calculates an attribute parameter (Step S439). Here, a three-dimensional space along three axes, novelty seeking, reward dependence, harm avoidance is considered in the embodiment as described above with reference to FIG. 27, and attributes are classified into eight attributes (an adventurer, an explosive attribute, a passionate attribute, a nervous attribute, an independent attribute, a logical attribute, a serious attribute, and a careful attribute) depending in how large the values of the respective axes are. The attribute analysis unit 503 calculates an attribute parameter on the basis of a frequency at which characteristic keywords corresponding to these three axes are included in the conversation data. Here, an example of three attribute parameter contribution values in characteristic keywords is illustrated in FIG. 31. The attribute analysis unit 503, for example, has the table illustrated in FIG. 31.

The three attribute parameter contribution values (novelty seeking, reward dependence, and presence avoidance) illustrated in FIG. 31 are expressed as 0 to 1. In a case in which the keyword (that is, a conversation expression) "feel comfortable with stimulation" on the first line is included in conversation data, for example, the value of novelty seeking is "1" while the other values are "0". In addition, in a case in which the keyword "become a habit" on the fourth line is included in conversation data, the value of reward dependence is "1" while the other values are "0".

Therefore, the attribute analysis unit 503 retrieves all expressions (keywords) included in the table illustrated in FIG. 31 from the conversation data on the basis of the result of the morpheme analysis (word extraction) performed on the conversation data, and acquires a vector of an attribute parameter obtained by adding each attribute parameter contribution values for the discovered expression. If it is assumed that the respective attribute parameter contribution values are $g_{1\ to\ 3}$, a vector of an attribute parameter is obtained by the following Equation 2.

[Math. 2]

$$C = [\Sigma_i g_{1i}, \Sigma_i g_{2i}, \Sigma_i g_{3i}] \qquad \text{Equation 2}$$

The expression "I am worry about if I can make it in time" in the table of the attribute parameter contribute values is included in conversation data "I did study only for two hours today. I am worry about if I can make it in time before the examination." (utterer ID: U03), and the attribute parameter contribution value becomes c=[0.0, 0.0, 1.0] (the value of harm avoidance is "1.0") referring to the table illustrated in FIG. 31.

Then, the attribute analysis unit 503 saves the calculated attribute parameter as metadata of each conversation data item in the conversation history DB 511 (Step S442). Here, an example of conversation data accumulated in the conversation history DB 511 is illustrated in FIG. 32. The conversation data is data to which conversation IDs, dates and times of conversations, IDs of persons who have made conversations, texts (content of conversation), degrees of happiness, and attribute parameters are linked.

Next, the attribute analysis unit 503 updates the attribute DB 513 (Step S445). Information related to the attribute type of each utterer is accumulated in the attribute DB 513. The attribute type of the utterer can be determined on the basis of eight classifications in the three-dimensional space described with reference to FIG. 27. Here, an example of attribute data of the utterer accumulated in the attribute DB 513 is illustrated in FIG. 33. As illustrated in FIG. 33, utterer IDs, the numbers of utterances, attribute parameters, and attribute types are linked to the attribute data in the attribute DB 513. The attribute analysis unit 503 adds "1" to the number of utterances of the utterer ID: U03 of the aforementioned conversation data ("I did study only for two hours today. I am worry about if I can make it in time before the examination."), for example, and adds "1.0" to "harm avoidance" as an attribute parameter of the utterer.

The attribute type of the utterer can be determined on the basis of the eight classifications in the three-dimensional space described with reference to FIG. 27. Specifically, the attribute analysis unit 503 calculates the three attribute parameters (novelty seeking, reward dependence, and harm avoidance) per one utterance by dividing the value (sum) of each attribute parameter by the number of utterances (total number) and determines which of the eight classifications illustrated in FIG. 27 the attribute type corresponds to. Note that the attribute analysis unit 503 may classify the value of each attribute parameter at the threshold value of 0.5 and determine the attribute type. Here, an example of the three-dimensional space of the attribute parameter contribution values and the attribute types is illustrated in FIG. 34.

Figure 34:
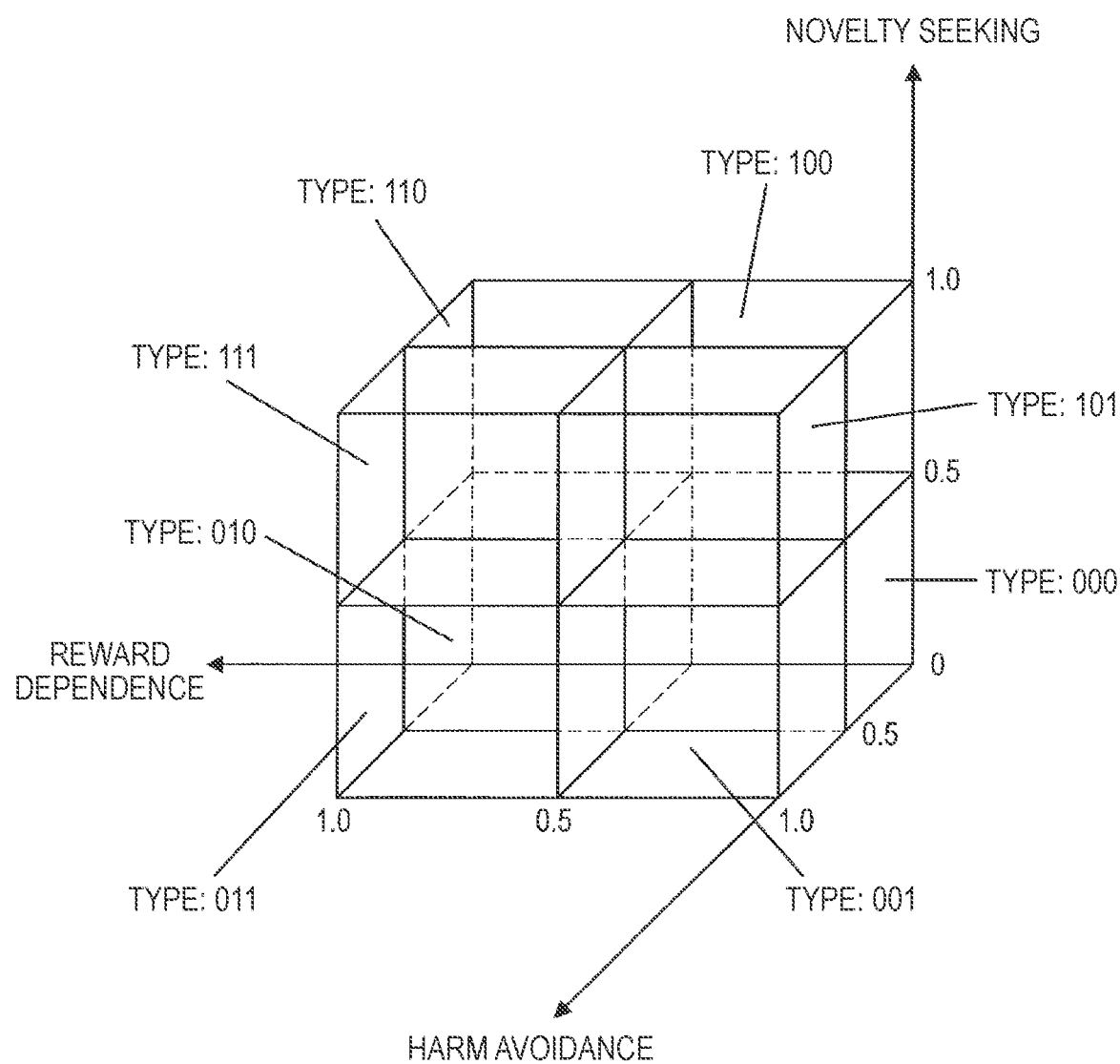
FIG. 34 is a diagram illustrating an example of a three-dimensional space of attribute parameter computer values and attribute types according to the second embodiment.

In the example illustrated in FIG. 34, eight attribute types in a case in which attribute parameters along three axes are classified at a threshold value of 0.5 are represented in the three-dimensional space. In this manner, it is possible to recognize that features of the respective attribute types are as follows.

Attribute type 000: An "independent" type who exhibits low novelty seeking, reward dependence, and harm avoidance Attribute type 001: A "logical attribute" type who exhibits low novelty seeking and reward dependence but has high harm avoidance Attribute type 011: A "careful attribute" type who exhibits low novelty seeking but has high reward dependence and harm avoidance Attribute type 111: A "nervous attribute" type who exhibits high novelty seeking, reward dependence, and harm avoidance Attribute type 010: A "serious attribute" type who exhibits low novelty seeking and harm avoidance but high reward dependence Attribute type 110: A "passionate attribute" type who exhibits high novelty seeking and reward dependence but has low harm avoidance Attribute type 100: An "adventurer" type who exhibits high novelty seeking but has low reward dependence and harm avoidance Attribute type 101: An "explosive attribute" type who exhibits high novelty seeking and harm avoidance but has low reward dependence When the attribute type of the utterer ID: U01 illustrated on the first line in FIG. 33 is determined, for example, the attribute analysis unit 503 first calculates attribute parameters per utterance as follows.

Novelty seeking: 127.9/2736=0.046
Reward dependence: 354.2/2736=0.13
Harm avoidance: 2012.4/2736=0.73

In this manner, the attribute analysis unit 503 can classify the calculated attribute parameters at the threshold value of 0.5 and determine that the attribute type is "001" of low novelty seeking, low reward dependence, and high harm avoidance.

The attribute type determined as described above is linked as metadata to the conversation frame generated in Step S422 (see FIG. 29) described above. That is, the conversation learning unit 502 acquires, from the attribute DB 513, the attribute type corresponding to the utterance ID, due to the utterance of which the degree of happiness has increased, in the conversation data as a basis of the generated conversation frame and links the attribute type to the generated conversation frame. For example, an exemplary case in which a conversation frame is generated on the basis of a series of conversations (conversation ID: C01) of "I made a tasty gratin yesterday!" (utterance ID: U01), "You can make a tasty gratin. That sounds great." (utterance ID: U02), and "Not really great, but thank you" (utterance ID: U01) will be described. In this case, the attribute type 001 corresponding to the utterer ID: U01 who has made the utterance of "Not really great, but thank you" due to which the degree of happiness has increased is linked to the conversation frame. FIG. 35 illustrates an example of conversation frames registered in the conversation frame DB 512. As illustrated in FIG. 25, the attribute types are linked to the respective conversation frames. In this manner, it is possible to select a conversation frame to be used in accordance with the attribute type of the user and to more effectively lead the user's feeling to a predetermined feeling (a happy feeling here) in the embodiment.

Then, Steps S433 to S445 described above are repeated until an instruction for ending them is provided (Step S448). Steps S433 to S445 described above are periodically (such as once a day or once in six hours) performed, for example.

<5-2. Generation of Response Sentence>
(5-2-1. Configuration of Dialogue Processing Unit 300B)

Figure 36:
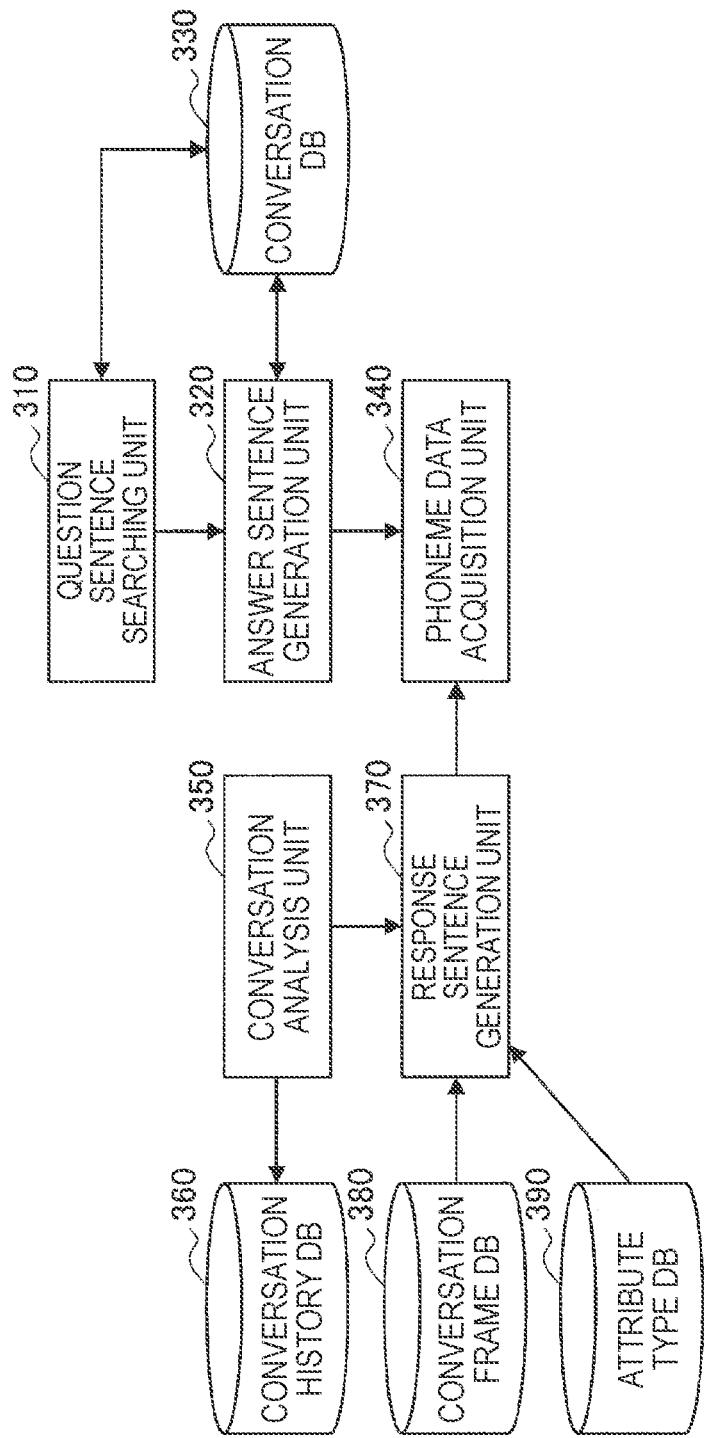
FIG. 36 is a diagram illustrating a configuration example of a dialogue processing unit according to the second embodiment.

Next, a configuration of a dialogue processing unit 300B according to the second embodiment will be described. FIG. 36 is a diagram illustrating a configuration example of the dialogue processing unit 300B according to the second embodiment. As illustrated in FIG. 36, the dialogue processing unit 300B has a question sentence retrieval unit 310, an answer sentence generation unit 320, a conversation DB 330, a phoneme data acquisition unit 340, a conversation analysis unit 350, a conversation history DB 360, a response sentence generation unit 370, a conversation frame DB 380, and an attribute type DB 390.

Since the question sentence retrieval unit 310, the answer sentence generation unit 320, the conversation DB 330, the phoneme data acquisition unit 340, a conversation analysis unit 350, and the conversation history DB 360 are similar to those in the first embodiment as illustrated in FIG. 23, description thereof will be omitted here.

The response sentence generation unit 370 retrieves a conversation frame including coincident syntax from the conversation frame DB 380 on the basis of the analysis result of the conversation analysis unit 350. A data set of conversation frames accumulated in the conversation frame DB 512 of the conversation DB generation unit 50B is saved in the conversation frame DB 380. Note that attribute types for which the conversation frames are used are described in addition to the content described in the first embodiment in the conversation frame DB 380 (see FIG. 35). The conversation frames are used only for persons of the attribute types that are the same as the attribute types in the embodiment.

In a case in which a conversation sentence of user is "I did it! I made beautiful flower arrangement!", for example, the response sentence generation unit 370 retrieves a condition (utterance condition frame) that coincides with a result of syntax analysis for abstracting a noun phrase, namely "I did it! I made a <adjective: positive> <noun>!" from the conversation frame DB 380. At this time, an attribute type of the user is acquired from the attribute type DB 390 and is used for the retrieval. In a case in which conversation frames as illustrated in FIG. 35 are saved, for example, condition frames of the frame IDs: F01, F04, and F05 coincide with each other.

In a case in which the attribute type of the user is a type of strong harm avoidance: 001, the response sentence generation unit 370 selects the conversation frame F01 and generates the following response sentence: "You can make beautiful flower arrangement! That sounds great!"

In contrast, in a case in which the attribute type of the user is a type of strong reward dependence: 010, the response sentence generation unit 370 selects the conversation frame F04 and generates the following response sentence: "Making beautiful flower arrangement is fun! Let's make more!"

In addition, in a case in which the attribute type of the user is a type of strong novelty seeking: 100, the response sentence generation unit 370 selects the conversation frame F05 and generates the following response sentence: "You can make more beautiful flower arrangement! You can do it!"

The response sentence data generated by the response sentence generation unit 370 is output to the phoneme data acquisition unit 340, phonemes of a specific agent are acquired by the phoneme data acquisition unit 340, and the response sentence data and the phoneme data are output to the voice agent I/F 20. Then, the response sentence data is vocalized as voice of the specific agent by the voice agent I/F 20 and is then output as a speech of the specific agent from the client terminal 1.

The configuration of the dialogue processing unit 300B according to the first embodiment has been described above. Next, operation processing of the dialogue processing unit 300B according to the embodiment will be described.

(5-2-2. Response Sentence Generation Processing)

Figure 37:
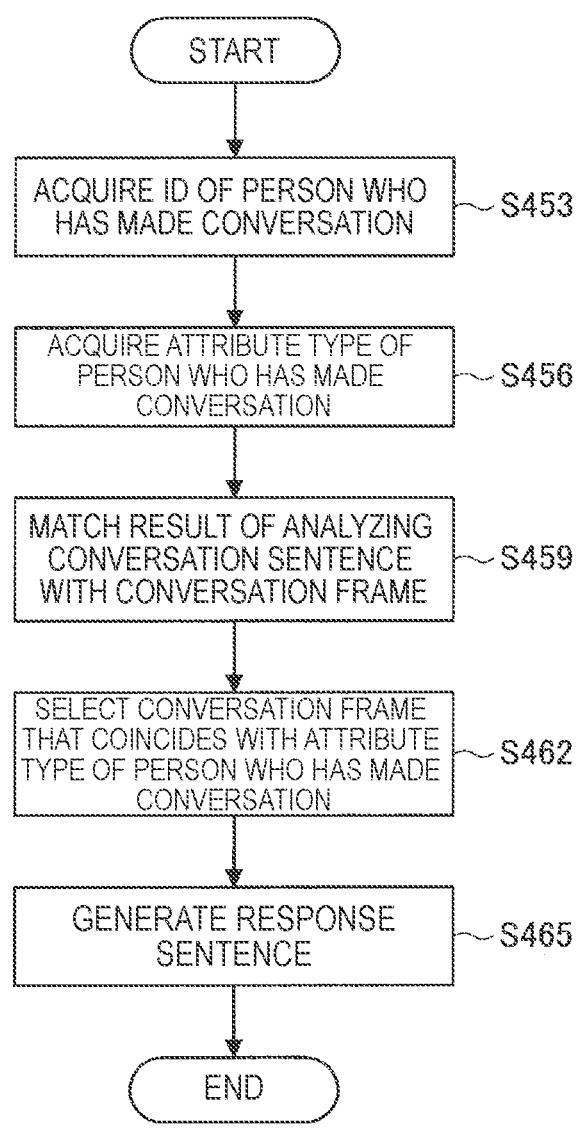
FIG. 37 is a flowchart illustrating response sentence generation processing according to the second embodiment.

FIG. 37 is a flowchart illustrating response sentence generation processing according to the second embodiment. As illustrated in FIG. 37, the response sentence generation unit 370 first acquires an ID of a person who has made a conversation (Step S453). The ID of the person who has made a conversation can be transmitted from the client terminal 1 of the user, for example.

Next, the response sentence generation unit 370 acquires an attribute type of the ID of the person who has made the conversation from the attribute type DB 390 (Step S456).

Then, the response sentence generation unit 370 matches a result of analyzing a conversation sentence (utterance voice of the user) by the conversation analysis unit 350 with conversation frames accumulated in the conversation frame DB 380 (Step S459). The conversation analysis unit 350 performs syntax analysis on the conversation sentence of the user that has been acquired by the voice agent I/F 20 and has been changed into texts, in a manner similar to that in the first embodiment.

Next, the response sentence generation unit 370 further selects a conversation frame that matches the attribute type of the person who has made the conversation (user) from among the conversation frames including condition frames that match the analysis result (Step S462).

Then, the response sentence generation unit 370 generates response sentence data by using a response frame of the selected conversation frame (Step S465).

The response sentence generation processing according to the embodiment has been described above. Note that since the response sentence output processing according to the second embodiment is similar to the response sentence output processing according to the first embodiment as described above with reference to FIG. 26, description thereof will be omitted here.

<<6. Conclusion>>

As described above, the communication control system according to the embodiment of the present disclosure can lead the user to a predetermined feeling by using a conversation structure generated from actual conversations between users.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to also generate a computer program causing hardware such as the CPU, the ROM, and the RAM contained in the client terminal 1 or the agent server 2 described above to realize the function of the client terminal 1 or the agent server 2. In addition, a computer-readable storage medium that stores the computer program is also provided.

In addition, in the above-described embodiment, the configuration in which various functions are realized by the agent server 2 on the Internet has been described, but the embodiment is not limited thereto. At least a part of the configuration of the agent server 2 illustrated in FIG. 3 may be realized in the client terminal 1 (a smartphone, a wearable terminal, or the like) of the user. In addition, the whole configuration of the agent server 2 illustrated in FIG. 3 may be installed in the client terminal 1 so that the client terminal 1 can perform all the processes.

In addition, although the aforementioned embodiment in which the response sentence data is vocalized by the voice agent I/F 20 by using predetermined phoneme data, and the voice is transmitted to the client terminal 1 and outputs as a speech from the agent has been described, the embodiment is not limited thereto. For example, the voice agent I/F 20 may transmit the response sentence data and the phoneme data to the client terminal 1, and the client terminal 1 may vocalize the response sentence data by using the phoneme data and output the voice as a speech of the agent, Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication system including:

a communication unit that receives a conversation of a user;

an accumulation unit that accumulates a conversation frame that describes a structure of a conversation generated on a basis of the conversation of the user collected via the communication unit; and a control unit that obtains a feeling parameter related to a feeling of the user who sends the conversation in units of the collected conversation, extracts the conversation frame from the conversation on a basis of the feeling parameter, and accumulates the conversation frame in the accumulation unit.

(2)
   The communication system according to (1),
   in which the control unit
      analyzes the structure of the conversation of the user received from the client terminal via the communication unit, and
      generates response text of an agent on a basis of the conversation frame that coincides with the analyzed structure and that is accumulated in the accumulation unit.

(3)
   The communication system according to (2),
   in which the control unit
      associates the conversation frame with attribute information of the user who has the conversation which is a basis of the conversation frame, and accumulates the attribute information and the conversation frame in the accumulation unit, and
      extracts, from the accumulation unit, the conversation frame that corresponds to the attribute information of the user of the client terminal and a structure that coincides with the structure of the analyzed conversation of the user, and generates response text on a basis of the extracted conversation frame.

(4)
   The communication system according to (2) or (3), in which the control unit transmits the generated response text to the client terminal via the communication unit.

(5)
   The communication system according to (2) or (3), in which the control unit generates voice synthesis data by performing voice synthesis on the response text and transmits the voice synthesis data to the client terminal via the communication unit.

(6)
   The communication system according to any one of (1) to (5), in which the control unit links a conversation response frame that describes a structure of a conversation of a second user, which is estimated to be a factor in an increase in a level of the feeling parameter corresponding to a conversation of a first user, to a conversation condition frame that describes a structure of the conversation of the first user that occurs chronologically before the conversation of the second user, which is estimated to be the factor, and accumulates the conversation response frame and the conversation condition frame in the accumulation unit.

(7)
   The communication system according to (6),
   in which the control unit analyzes a structure of a conversation of a user received from a client terminal via the communication unit, and
   if the conversation condition frame that coincides with the analyzed structure is detected from the accumulation unit, the control unit specifies a conversation response frame accumulated in association with the detected conversation condition frame, and generates a response text of an agent on a basis of the conversation response frame.

(8)
   The communication system according to (7),
   in which the control unit associates attribute information of the first user with the conversation condition frame and the conversation response frame and accumulates the attribute information, the conversation condition frame, and the conversation response frame in the accumulation unit, and
   if the conversation condition frame that corresponds to the analyzed structure and the attribute information of the user is detected from the accumulation unit, the control unit specifies a conversation response frame accumulated in association with the detected conversation condition frame, and generates response text of an agent on a basis of the conversation response frame.

(9)
   The communication system according to any one of (6) to (8), in which the control unit links a conversation response frame that describes a structure of a conversation of the second user, which is estimated to be a factor in an increase in a degree of happiness that represents a level of the feeling parameter corresponding to a conversation of the first user, to a conversation condition frame that describes a structure of a conversation of the first user that occurs chronologically before the conversation of the second user, which is estimated to be the factor, and accumulates the conversation response frame and the conversation condition frame in the accumulation unit.

(10)
   The communication system according to (9), in which the degree of happiness is calculated on a basis of four factors related to happiness.

(11)
   The communication system according to any one of (1) to (10), in which the control unit collects a conversation of the user on social media via the communication unit.

(12)
   The communication system according to (11), in which the control unit collects a voice conversation of the user via the communication unit.

(13)
   A communication control method including, by a processor:
   receiving a conversation of a user by a communication unit;
   accumulating, in an accumulation unit, a conversation frame that describes a structure of a conversation generated on a basis of the conversation of the user collected via the communication unit;
   obtaining a feeling parameter related to a feeling of the user who sends the conversation in units of the collected conversation; and
   extracting the conversation frame from the conversation on a basis of the feeling parameter and accumulating the conversation frame in the accumulation unit.

REFERENCE SIGNS LIST 1 client terminal
2 agent server
30 dialogue processing unit
300, 300A, 300B dialogue processing unit
310 question sentence retrieval unit
320 answer sentence generation unit
330 conversation DB
340 phoneme data acquisition unit
350 conversation analysis unit
360 conversation history DB
370 response sentence generation unit
380 conversation frame DB
390 attribute type DB
31 basic dialogue processing unit
32 character A dialogue processing unit
33 person B dialogue processing unit
34 person C dialogue processing unit
40 phoneme storage unit
41 basic phoneme DB
42 character A phoneme DB 43 person B phoneme DB
44 person C phoneme DB
50, 50A, 50B conversation DB generation unit
500, 520 control unit
501 happiness analysis unit
502 conversation learning unit
503 attribute analysis unit
510 communication unit
511 conversation history DB
512 conversation frame DB
513 attribute DB
60 phoneme DB generation unit
70 advertisement insertion processing unit
72 advertisement DB
80 feedback acquisition processing unit
3 network

The invention claimed is:

1. A communication system, comprising:
a communication unit configured to receive a conversation of a first user;
a control unit configured to:
   determine a degree of happiness of the conversation of the first user, wherein the degree of happiness is associated with happiness of the first user;
   generate a feeling parameter based on the conversation of the first user, wherein the feeling parameter corresponds to a feeling of the first user;
   extract first conversation data from the conversation of the first user based on the feeling parameter and second conversation data, wherein
      a first degree of happiness of the second conversation data is greater than a second degree of happiness of the first conversation data,
      each of the first conversation data and the second conversation data corresponds to contents of the conversation of the first user, and
      the second conversation data occurs chronologically after the first conversation data in the conversation of the first user;
   calculate an attribute parameter of the first user based on the first conversation data, wherein the attribute parameter of the first user corresponds to temperament of the first user; and
   generate a conversation frame for an agent of the communication system based on the extracted first conversation data and the attribute parameter of the first user, wherein the conversation frame indicates a conversation structure to lead the first user to a specific feeling; and
an accumulation unit configured to accumulate the conversation frame and the attribute parameter of the first user.

2. The communication system according to claim 1, wherein
the communication unit is further configured to receive a conversation of a second user from a client terminal; and
the control unit is further configured to:
   analyze a structure of the conversation of the second user, and
   generate response text of the agent based on the conversation frame, wherein the conversation frame corresponds to the analyzed structure.

3. The communication system according to claim 2, wherein the control unit is further configured to:
associate the conversation frame with attribute information of the first user,
accumulate the attribute information and the conversation frame in the accumulation unit,
extract, from the accumulation unit, the conversation frame, wherein
   the extracted conversation frame corresponds to attribute information of the second user of the client terminal and the analyzed structure of the conversation of the second user, and
generate the response text based on the extracted conversation frame.

4. The communication system according to claim 2, wherein the control unit is further configured to transmit the generated response text to the client terminal via the communication unit.

5. The communication system according to claim 2, wherein the control unit is further configured to:
generate voice synthesis data based on voice synthesis on the generated response text; and
transmit the voice synthesis data to the client terminal via the communication unit.

6. The communication system according to claim 1, wherein the control unit is further configured to:
link a conversation response frame of the conversation frame with a conversation condition frame of the conversation frame to increase a level of the feeling parameter, wherein
   the conversation response frame indicates a structure of a conversation of a second user, and
   the conversation condition frame indicates a structure of the conversation of the first user that occurs chronologically before the conversation of the second user; and
accumulate the conversation response frame and the conversation condition frame in the accumulation unit.

7. The communication system according to claim 6, wherein
the communication unit is further configured to receive a conversation of a third user from a client terminal; and
the control unit is further configured to:
   analyze a structure of the conversation of the third user,
   detect the conversation condition frame from the accumulation unit, wherein
      the detected conversation condition frame corresponds to the analyzed structure, specify the conversation response frame, wherein the specified conversation response frame is accumulated in association with the detected conversation condition frame, and
   generate a response text of the agent based on the specified conversation response frame.

8. The communication system according to claim 7, wherein the control unit is further configured to:
associate attribute information of the first user with the conversation condition frame and the conversation response frame,
accumulate the attribute information of the first user, the conversation condition frame, and the conversation response frame in the accumulation unit,
detect the conversation condition frame from the accumulation unit, wherein the conversation condition frame corresponds to the analyzed structure and attribute information of the third user,
specify the conversation response frame, wherein the specified conversation response frame is accumulated in association with the detected conversation condition frame, and
generate the response text of the agent based on the specified conversation response frame.

9. The communication system according to claim 6, wherein
    the control unit is further configured to determine the degree of happiness of the conversation of the first user based on four factors, and
    the four factors correspond to the happiness of the first user.

10. The communication system according to claim 1, wherein the control unit is further configured to collect the conversation of the first user on social media via the communication unit.

11. The communication system according to claim 10, wherein the control unit is further configured to collect a voice conversation of the first user on social media via the communication unit.

12. A communication control method, comprising:
    in a communication system:
    receiving a conversation of a user by a communication unit;
    determining a degree of happiness of the conversation of the user, wherein the degree of happiness is associated with happiness of the user;
    generating a feeling parameter based on the conversation of the user, wherein the feeling parameter corresponds to a feeling of the user;
    extracting first conversation data from the conversation of the user based on the feeling parameter and second conversation data, wherein
        a first degree of happiness of the second conversation data is greater than a second degree of happiness of the first conversation data,
        each of the first conversation data and the second conversation data corresponds to contents of the conversation of the user, and
        the second conversation data occurs chronologically after the first conversation data in the conversation of the user;
    calculating an attribute parameter of the user based on the first conversation data, wherein the attribute parameter of the user corresponds to temperament of the user;
    generating a conversation frame for an agent of the communication system based on the extracted first conversation data and the attribute parameter of the user, wherein the conversation frame indicates a conversation structure to lead the user to a specific feeling; and
    accumulating the conversation frame and the attribute parameter of the user in an accumulation unit.

* * * * *